United States Patent [19]
Suito et al.

[11] Patent Number: 6,065,943
[45] Date of Patent: May 23, 2000

[54] REFRIGERANT COMPRESSOR HAVING IMPROVED DRIVE POWER TRANSMISSION UNIT

[75] Inventors: Ken Suito; Shinichi Ogura, both of Kariya; Takashi Michiyuki, Anjo; Koji Kawamura, Kariya; Masahiko Okada, Kariya; Masahiro Kawaguchi, Kariya; Takuya Okuno, Kariya, all of Japan

[73] Assignee: Denso Corporation, Kariya, Japan

[21] Appl. No.: 08/632,888

[22] Filed: Apr. 16, 1996

[30] Foreign Application Priority Data

Apr. 18, 1995 [JP] Japan ..................................... 7-092734
Jun. 12, 1995 [JP] Japan ..................................... 7-144574

[51] Int. Cl.[7] .............................. F04B 17/00; A63D 5/08
[52] U.S. Cl. .............................................. 417/362; 474/94
[58] Field of Search ................................ 417/362; 474/94

[56] References Cited

U.S. PATENT DOCUMENTS

| | | |
|---|---|---|
| 3,257,860 | 6/1966 | Rune et al. ................................ 474/94 |
| 3,599,503 | 8/1971 | Schultz, Jr. ............................... 474/94 |
| 4,143,525 | 3/1979 | Major . | 
| 4,486,183 | 12/1984 | Posiviata et al. ......................... 474/94 |
| 5,048,657 | 9/1991 | Dissett et al. . | 
| 5,173,032 | 12/1992 | Taguchi et al. . | 
| 5,242,154 | 9/1993 | Schmidt . | 
| 5,308,289 | 5/1994 | Funahasi .................................. 474/94 |
| 5,540,626 | 7/1996 | Asai et al. ................................ 474/94 |
| 5,586,870 | 12/1996 | Kawaguchi et al. .................... 417/362 |

FOREIGN PATENT DOCUMENTS

| | | |
|---|---|---|
| 0550971 | 7/1993 | European Pat. Off. . |
| 0702167 | 9/1995 | European Pat. Off. . |
| 63-142460 | 9/1988 | Japan . |
| 6346845 | 12/1994 | Japan . |
| 146775 | 3/1971 | United Kingdom . |

Primary Examiner—Bibhu Mohanty
Attorney, Agent, or Firm—Burgess, Ryan & Wayne

[57] ABSTRACT

A refrigerant compressor having a drive shaft rotatable to cause compression of a refrigerant gas, and a drive power transmission unit for transmitting a drive power from an external drive power source to the drive shaft, the drive power transmission unit having a pulley freely rotatably mounted around the drive shaft, a power transmitting element fixed to the drive shaft, and a shock absorbent rubber element arranged between the pulley and the power transmitting element for providing a positive engagement between the rubber element and the pulley, and between the rubber element and the power transmitting element. The shock absorbent rubber element absorbs a change in a load torque applied to the compressor before the torque change is transmitted to the external drive power source via the pulley, and disengages from at least one of the pulley and the power transmitting element when an excessive load torque is applied to the compressor to interrupt transmission of the excessive load torque from the compressor to the external drive power source.

20 Claims, 14 Drawing Sheets

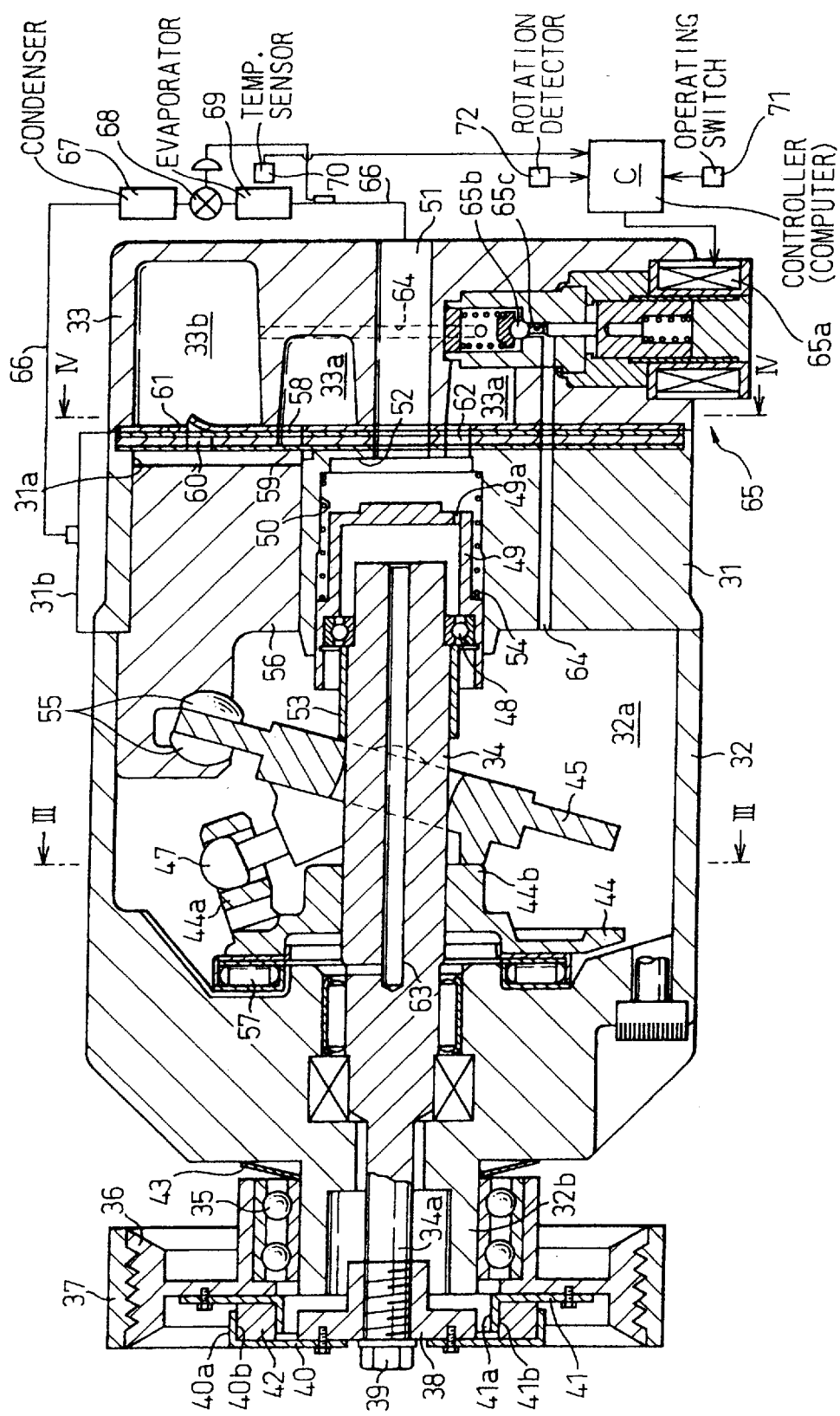

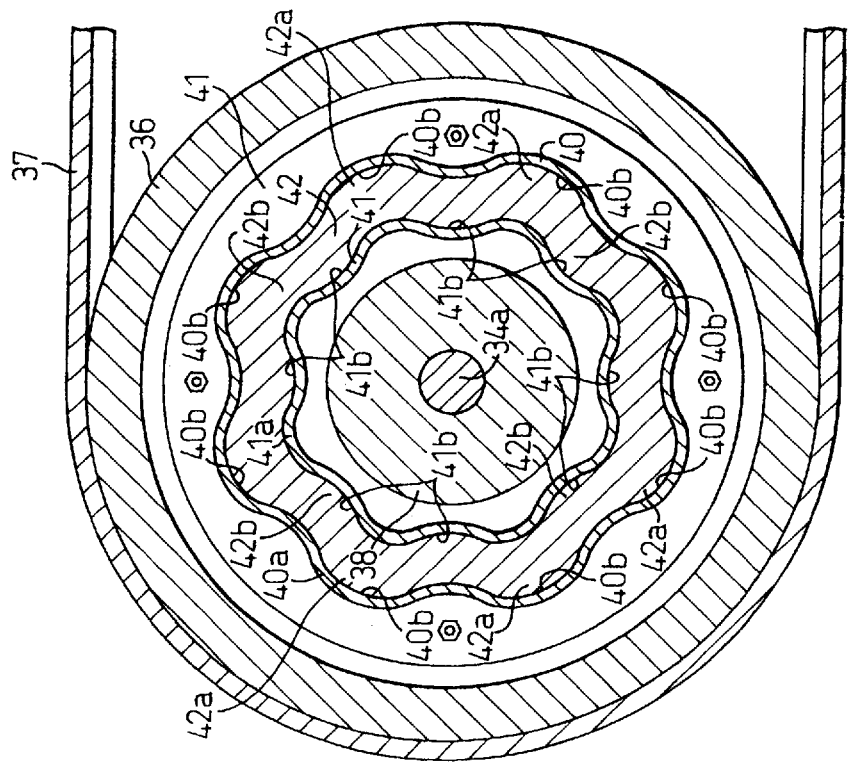
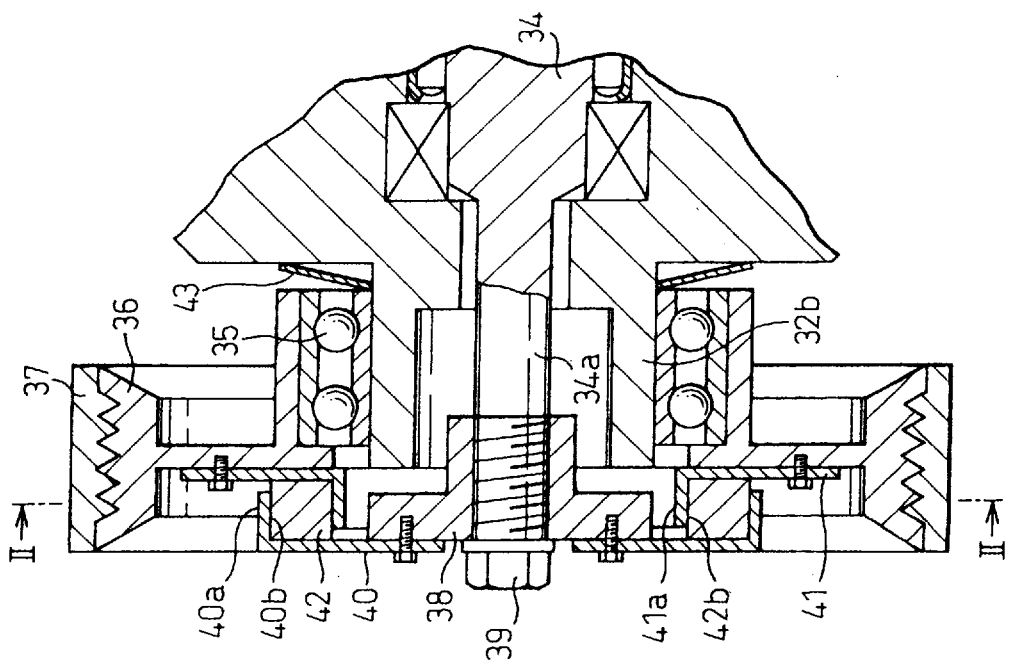
Fig. 2A
Fig. 2B

REFRIGERANT COMPRESSOR HAVING IMPROVED DRIVE POWER TRANSMISSION UNIT

BACKGROUND OF THE INVENTION

1. Field of the Invention

The present invention relates generally to an improvement in the construction of a refrigerant compressor driven by an external drive power source, e.g., a automobile engine, and more particularly, relates to a power transmission unit accommodated in a refrigerant compressor which is suitable for being incorporated in a climate control system of an automobile so as to be driven by the engine of the automobile.

2. Description of the Related Art

There have been proposed non-clutch type refrigerant compressors driven by an external drive source without the intervention of a solenoid clutch. The non-clutch type refrigerant compressor provided with no solenoid clutch between the external drive source and the drive shaft thereof has an advantage such that when the compressor is mounted on an automobile to be accommodated in the climate control system, the driver and a fellow passenger or passengers in the automobile do not suffer from unpleasant feeling due to the shock caused by energizing and de-energizing of the solenoid clutch. Nevertheless, in the non-clutch type refrigerant compressor having no solenoid clutch between the external drive source and the drive shaft of the compressor, a change in a load torque applied to the compressor is often directly transmitted to the external drive source, i.e., to the automobile engine before the load is attenuated, and accordingly, an inconvenient change in the rotation of the automobile engine occurs.

Japanese Unexamined Utility Model Application (Kokai) No. 63-142460 discloses a transmission unit for a non-clutch type refrigerant compressor. In the transmission unit, a pulley member is mounted around a drive shaft of the compressor via an anti-friction bearing so as to receive external drive power from an external drive source. Further, a hub member is fixedly mounted on the drive shaft of the compressor so as to be coaxial with the pulley. The pulley member is operatively connected to the hub member via a plurality of pivotal drive levers to thereby transmit the external drive power to the drive shaft of the compressor via the hub member. Namely, the pulley member is provided with an annularly extending inner wall portion in which a plurality of engaging recesses are formed, and the hub member is provided with an annularly extending outer wall portion in which a plurality of similar engaging recesses are formed. Each of the plurality of pivotal drive levers is provided with engaging ends, one of which is fitted in the engaging recess of the pulley member and the other of which is fitted in the engaging recess of the hub member via an annular-shape spring member mounted around the hub member. Thus, the rotation of the pulley member can be transmitted to the drive shaft of the compressor via the pivotal drive levers, the spring member and the hub member. When a change in a load (torque) applied to the refrigerant compressor occurs, the change is reversely transmitted to the pulley member after it is attenuated by the pivotal movement of the drive levers between the pulley and hub members and the resilience of the spring member. Thus, the change in the load applied to the compressor does not adversely affect on the operation of the drive source such as an automobile engine, and accordingly a change in the rotation of the automobile engine does not occur. Further, when the change in the load applied to the compressor increases to a predetermined load level, the ends of the respective pivotal drive levers are urged to disengage from the recesses of the hub member via the annular spring member, and accordingly, an excess load torque is not transmitted to the automobile engine via the pulley member. Nevertheless, the construction of the transmission unit of Japanese Unexamined Utility Model Application (Kokai) No. 63-142460 is very complicated due to the provision of the plurality of pivotal drive levers between the pulley member and the hub member and due to the resilient support of the pivotal drive levers by the annular spring member. Further, since the number of members and parts is large and the time necessary for the assembly of the transmission unit is long, the manufacturing cost of the non-clutch type refrigerant compressor must become high.

SUMMARY OF THE INVENTION

An object of the present invention is, therefore, to eliminate the defects of the conventional transmission unit for a non-clutch type refrigerant compressor.

Another object of the present invention is to provide a non-clutch type refrigerant compressor provided with a novel transmission unit having a simple construction and capable of preventing any excessive load torque from being transmitted from the compressor to an external drive source.

Further object of the present invention is to provide a non-clutch type refrigerant compressor provided with a transmission unit capable of disconnecting a drive shaft of the compressor from an external drive source as soon as a load torque applied to the compressor reaches a predetermined constant torque level.

In accordance with the present invention, there is provided a refrigerant compressor comprising a drive shaft driven for rotation by an external drive power transmitting from an external drive source; a compressing mechanism housed in a housing means for compressing a refrigerant gas in response to a rotation of the drive shaft; and a drive power transmission unit having a pulley means mounted around the drive shaft for receiving a drive power supplied from the external drive source to drive the drive shaft, wherein the drive power transmission unit further comprises:
a drive power transmitting means fixed to a front end of the drive shaft outwardly extending from the housing means of the compressor;
a shock absorbent rubber means elastically deformably arranged between the pulley means and the drive power transmitting means; and
means for providing a positive engagement between the shock absorbent rubber element and at least one of the pulley means and the power transmitting means.

Thus, when a change in a load torque applied to the refrigerant compressor occurs, the change in the load torque is absorbed and attenuated by elastic deformation of the shock absorbent rubber means to a small torque which does not adversely affect the external drive power source even when the small torque is transmitted to the pulley means. Further, when an excessive load torque is applied to the refrigerant compressor, the shock absorbent rubber means is elastically deformed until the rubber means is urged to break the positive engagement with at least one of the pulley means and the drive power transmitting means. Thus, during the transmission of the drive power from the pulley means to the power transmitting means, the shock absorbent rubber means slips between the pulley and power transmitting means and fails to transmit the drive power. Namely, the transmission of the drive power from the pulley means to the drive power transmitting means is interrupted, i.e., the drive power transmission unit disengages the refrigerant compressor from the drive power source. Accordingly, the external drive source, e.g., an automobile engine can be prevented from being adversely affected by an excessive load applied to the refrigerant compressor, by a simple arrangement of the power transmitting means fixed to the drive shaft of the refrigerant compressor and the shock absorbent rubber means.

Preferably, the pulley means mounted around the drive shaft and the power transmitting means fixed to the drive shaft are provided with radially confronting inner and outer cylindrical faces having concave recesses, respectively, for receiving the shock absorbent rubber means to thereby form means for providing the positive engagement between the shock absorbent rubber means and the pulley means and between the shock absorbent rubber means and the power transmitting means.

Preferably, the concave recesses of the pulley means are arranged in a repeated manner in the circumferential direction of the pulley means leaving a given space between the two neighboring recesses, and the concave-shape recesses of the power transmitting means are also arranged in a repeated manner in the circumferential direction of the power transmitting means leaving a different given space between the two neighboring recesses.

Preferably, the recesses of the pulley means are circumferentially shifted with respect to the recesses of the power transmitting means.

Preferably, the shock absorbent rubber means comprises a generally annular rubber element provided with outer and inner wavy circumferences having convex portions arranged in a repeated manner in the circumferential direction, leaving a given space between two neighboring convex portions. Then, the convex portions of the annular shock absorbent rubber element are positively engaged with the concave-shape recesses of the pulley means and the power transmitting means.

The refrigerant compressor preferably comprises a non-clutch type refrigerant compressor in which the drive shaft is operatively connected to the external drive power source.

Alternatively, the refrigerant compressor may comprise a refrigerant compressor incorporating therein a solenoid clutch means having a stationary clutch plate and a movable clutch plate. Then the movable clutch plate of the solenoid clutch means and the power transmitting means are provided with confronting portions thereof having recessed portions, respectively, for providing a positive engagement with the shock absorbent rubber means arranged between the confronting portions of the movable clutch plate of the solenoid clutch means and the power transmitting means.

The shock absorbent rubber means may be a generally annular rubber element having a plurality of bulged portions arranged at a given circumferential space between respective two neighboring bulged portions. The respective bulged portions of the shock absorbent rubber means are positively engaged with the recesses of the pulley means and the power transmitting means, and are preferably provided with through-holes bored therein.

The shock absorbent rubber means may be a generally annular rubber element having a plurality of bulged portions arranged at a given circumferential space between respective two neighboring bulged portions, each of the respective bulged portions being provided with a cut-portion at a position spaced from the center of each bulged portion in a direction reverse from the direction of rotation of the pulley means.

A space may be provided between a connecting portion of the shock absorbent rubber element, which interconnects between the two neighboring bulged portions, and at least one of the pulley means and the power transmitting means.

Preferably, the shock absorbent rubber element may be provided with at least a face confronting either the pulley means or the power transmitting means and coated with a layer of substance having a stable coefficient of friction.

On the other hand, the pulley means or the power transmitting means may have a face in contact with the shock absorbent rubber means covered with a layer of substance having a stable coefficient of friction.

BRIEF DESCRIPTION OF THE DRAWINGS

The above and other objects, features, and advantages of the present invention will be made more apparent from the ensuing description of preferred embodiments with reference to the accompanying drawings wherein:

FIG. 1 is a longitudinal cross-sectional view of a refrigerant compressor provided with a drive power transmission unit according to a first embodiment of the present invention;

FIG. 2A is a cross-sectional view of an important portion of the compressor of FIG. 1;

FIG. 2B is a cross-sectional view of the drive power transmission unit, taken along the line II—II of FIG. 2A;

DESCRIPTION OF THE PREFERRED EMBODIMENTS

Figure 3:
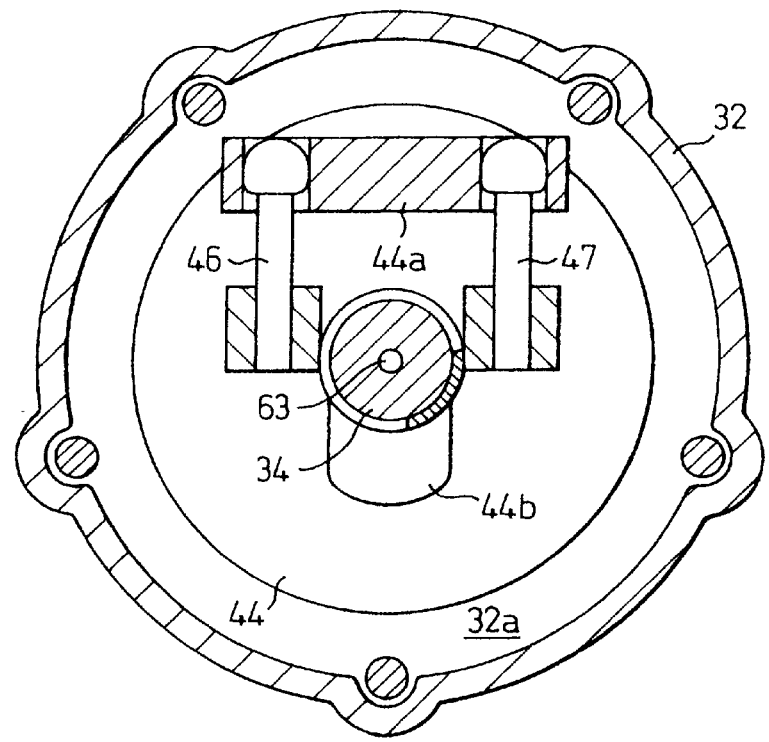
FIG. 3 is a cross-sectional view of the compressor, taken along the line III—III of FIG. 1.

The first embodiment of the present invention will be described below with reference to FIGS. 1 through 4.

Referring to FIG. 1, a refrigerant compressor, i.e., non-clutch type refrigerant compressor, is provided with a cylinder block 31 having a front end closed by a front housing 32 and a rear end closed by a rear housing 33. A crank chamber 32a is defined within the front housing 32 and located in front of the front end of the cylinder block 31. In the crank chamber 32a, an axial drive shaft 34 is rotatably supported by the front housing 32 and the cylinder block 31 via a pair of front and rear anti-friction bearings, and a front end of the drive shaft 34 extends through the front housing 32 toward the exterior of the front housing 32. The front housing 32 is provided with a cylindrical support portion 32b formed integrally therewith at the frontmost portion to support a large anti-friction angular type bearing 35. The angular type anti-friction bearing 35 is arranged to be slightly slidable on the cylindrical support portion 32b, and supports both a radial and a thrust load. On the outer race of the bearing 35 is mounted a pulley 36 around which a belt 37 is wound so that the pulley 36 receives a drive power from an external drive power source such as an automobile engine (not shown). A spring element 43 such as a conventional Belleville spring is arranged between the inner race of the bearing 35 and the shoulder of the front housing 32 so as to adjustably preload the bearing 35 to thereby obtain an appropriate operating condition of the bearing 35.

The frontmost portion 34a of the drive shaft 34 is provided with screw threads formed thereon, and therefore, a power transmitting element 38 is threadedly engaged with the frontmost portion 34a of the drive shaft 34, and rigidly locked by a nut 39.

As shown in FIGS. 1, 2A, and 2B, the power transmitting element 38 has a front face to which an annular support plate 40 having an outer flange 40a is tightly screwed. A similar annular support plate 41 having an inner flange 41a is fixedly screwed to the front face of the pulley 36. The outer flange 40a of the annular support plate 40 and the inner flange 41a of the support plate 41 radially confront to one another via an annular space formed therebetween. As best shown in FIG. 2B, the flange 40a of the annular support plate 40 is provided with a plurality of recesses 40b equi-angularly arranged in the circumferential direction. Each of the recesses 40b is radially outwardly concave with respect to the center of the drive shaft 34. On the other hand, a plurality of recesses 41b are formed in the inner flange 41a of the support plate 41 so as to be equiangularly arranged in the circumferential direction. Each of the recesses 41b of the support plate 41 is radially inwardly concave with respect to the center of the drive shaft 34. Thus, the radially outward recesses 40b of the support plate 40 fixed to the power transmitting element 38 are circumferentially shifted with respect to the radially inward recesses 41b of the support plate 41 fixed to the pulley 36. In the annular space between the flange 40a of the annular support plate 40 and the flange 41a of the annular support plate 41, an annularly extending wave-shape shock absorbent rubber member 42 is arranged in a manner such that the absorbent rubber member 42 having outer and inner convex portions 42a and 42b in the outer and inner circumferences thereof completely fits in the annular space between the two flanges 40a and 41a, and the recesses 40b and 41b of the two flanges 40a and 41a of the support plates 40 and 41. Namely, a positive engagement is established between the flange 40a of the annular support plate 40 and the annular shock absorbent rubber 42, and between the annular shock absorbent rubber 42 and the flange 41a of the annular support plate 41.

The rotation of the automobile engine is transmitted to the pulley 36 via the belt 37 to rotate the pulley 36, and the rotation of the pulley 36 is transmitted to the drive shaft 34 of the compressor via the annular support plate 41, the shock absorbent rubber element 42, the annular support plate 40, and the drive power transmitting element 38.

As shown in FIGS. 1 and 3, in the crank chamber 32a, a drive plate 44 is mounted on the drive shaft 34 so as to be rotated together with the drive shaft 34. Further, a swash plate 45 is supported around the drive shaft 34 so that the swash plate 45 is axially slidable on the drive shaft 34, and is capable of changing an angle of inclination thereof with respect to a plane perpendicular to the axis of the drive shaft 34. The swash plate 45 is operatively engaged with a support arm 44a of the drive plate 44 via a pair of guide pins 46 and 47. Thus, the motion of the swash plate 45 to change the inclination thereof is guided by the guide pins 46 and 47 which are slidable in the guide holes formed in the support arm 44a, and the rotation of the swash plate 45 is caused by the rotation of the drive plate 44, which is transmitted via the support arm 44a of the drive plate 44 and the guide pins 46 and 47.

As shown in FIG. 1, a rear end of the drive shaft 34 is received in an axial bore 50 formed in the cylinder block 31, via the afore-mentioned anti-friction bearing 48 and a cap member 49. The rear housing 33 is centrally provided with an axial inlet port 51 formed therein to be fluidly communicated with the axial bore 50 of the cylinder block 31, and a radial positioning face 52 is provided at the bottom of the axial bore 50 of the cylinder block 31 and around an inner opening of the axial inlet port 51 of the rear housing 33. A rear end face of the cap member 49 can be moved to a position abutting against the positioning face 52 of the cylinder block 31. When the cap member 49 is moved away from a position close to the swash plate 45 to a position abutting against the positioning face 52 of the cylinder block 31, the fluid communication between the inlet port 51 and the axial bore 52 is interrupted.

When the angle of inclination of the swash plate 45 is reduced, the central portion of the swash plate 45 slides rearward on the drive shaft 34 so as to axially push an intermediate sleeve member 53 and the anti-friction bearing 48 toward the interior of the axial bore 50 of the cylinder block 31. Thus, the bearing 48 consisting of a single-row deep groove radial bearing can assume both a large radial and a thrust load applied to the drive shaft 34. The movement of the intermediate sleeve member 53 causes the cap member 49 to move toward the positioning face 52 against an axial spring force of a return spring 54 in the form of a coil spring fitted in the axial bore 50 of the cylinder block 31.

The swash plate 45 can be moved to have the smallest inclination angle position approximately close to but a slightly larger than the zero degree position. The smallest inclination angle position of the swash plate 45 is achieved when the cap member 49 is moved to the position where the fluid communication between the inlet port 51 and the axial bore 50 of the cylinder block 31 is interrupted.

On the contrary, the largest inclination angle position of the swash plate 45 is defined when a projecting portion of the swash plate abuts against a stop 44b of the drive plate 44.

The rotation of the swash plate 45 causes reciprocating motion of respective single-headed pistons 56 in the corresponding cylinder bores 31a due to intervention of a plurality of pairs of shoes 55.

Figure 4:
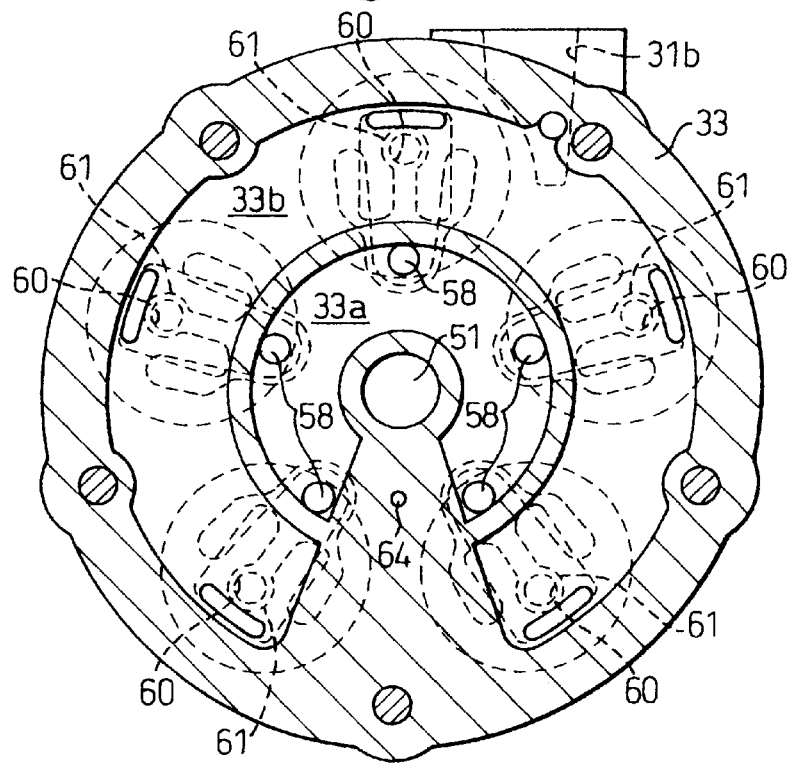
FIG. 4 is a cross-sectional view of the compressor, taken along the line IV—IV of FIG. 1.

As shown in FIGS. 1 and 4, the rear housing 33 is provided with a suction chamber 33a and a discharge chamber 33b. A refrigerant gas received in the suction chamber 33a is sucked into the respective cylinder bores 31a through respective suction ports 58 when suction valves 59 are opened during reciprocation of the single-headed pistons 56. The refrigerant gas sucked into the respective cylinder bores 31a is compressed by the pistons 56, and is then discharged from the cylinder bores 31a through discharge ports 60 when discharge valves 61 are opened during reciprocation of the single-headed pistons 56.

The drive plate 44 is axially supported by a thrust bearing 57 seated on an inner end of the front housing 32. Thus, a reacting force acting on the respective single-headed pistons 56 due to compression of the refrigerant gas within the respective cylinder bores 31a is assumed by the inner end of the front housing 32 via the shoes 55, the swash plate 45, the guide pins 46, 57, the drive plate 44, and the thrust bearing 57.

The suction chamber 33a of the rear housing 33 communicates with the axial bore 50 of the cylinder block 31 via a short axial gas passageway 62, and the communication between the suction chamber 33a and the axial bore 50 is interrupted when the axial gas passageway 62 is closed by the cap member 49 when the latter is moved rearward to the position in close contact with the positioning face 52 of the axial bore 50.

The drive shaft 34 is provided with a lengthy axial passageway 63 which is arranged so as to provide a fluid communication between the crank chamber 32a and the interior of the cap member 49. The cap member 49 is provided with a small pressure evacuation passageway 49a acting to provide a fluid communication between the axial bore 50 of the cylinder block 31 and the interior of the cap member 49.

The crank chamber 32a communicates with the discharge chamber 33b via a pressure supply passageway 64 in which a solenoid valve 65 is disposed. The solenoid valve 65 is provided with a solenoid 65a, a valve element 65b, and a valve port 65c. When the solenoid 65a is energized, the valve element 65b is moved to a position closing the valve port 65c, and is moved to a position opening the valve port 65c when the solenoid 65a is de-energized.

An external refrigerating circuit 66 including a condenser 67, an expansion valve 68, and an evaporator 69 is disposed so that the refrigerant after compression is supplied from the discharge chamber 33b to the condenser 67 via an outlet port 31b, and the refrigerant before compression is introduced from the evaporator 69 into the suction chamber 33a via the inlet port 51. The temperature of the evaporator 69 is detected by a temperature sensor 70, and the temperature sensor 70 supplies the detected temperature data to a controller C having an electronic computer unit therein. The controller C controls energizing and de-energizing of the solenoid 65a on the basis of the temperature data supplied from the temperature sensor 70. Namely, under a condition such that a climate controller operating switch 71 is turned "ON", when the temperature detected by the temperature sensor 70 is below a predetermined temperature, the controller C commands de-energizing of the solenoid 65a. It should be understood that a temperature below the above-mentioned predetermined temperature indicates a temperature at which the evaporator 69 may frost. Further, under the same ON- condition of the climate controller operating switch 71, the controller C commands de-energizing of the solenoid 65 on the basis of a particular rotation detecting signal supplied from a rotation detector 72 detecting the rotation of the automobile engine. The controller C commands de-energizing of the solenoid 65 when the climate controller operating switch 71 is turned off. When the solenoid 65 is de-energized, the valve port 65c is opened so that the pressure supply passageway 64 communicates between the discharge chamber 33b and the crank chamber 32a. Accordingly, the refrigerant gas having a high pressure flows from the discharge chamber 33b into the crank chamber 32a to increase a pressure level within the crank chamber 32a. In response to an increase in the pressure level within the crank chamber 32a, the angle of inclination of the swash plate 45 is reduced to the minimum inclination angle position. Thus, the cap member 49 is moved toward the positioning face 52 of the cylinder block 31. When the end of the cap member 49 comes to a position in contact with the positioning face 52, the swash plate 45 takes its position where the angle of inclination is at the minimum, and therefore, the flow of the refrigerant gas, from the evaporator 69 of the external refrigerating circuit 66 into the suction chamber 33a of the compressor, is stopped.

Since the minimum angle of inclination of the swash plate 45 is larger than zero degrees, the discharge of the refrigerant gas from the respective cylinder bores 31a toward the discharge chamber 33b constantly continues. Further, the refrigerant gas within the suction chamber 33a is continuously sucked into respective cylinder bores 31a, and is discharged from the cylinder bores 31a into the discharge chamber 33a after being compressed. Therefore, when the swash plate 45 is at the minimum angle of inclination, a gas circulating circuit for the refrigerant gas extending through the discharge chamber 33b, the pressure supply passageway 64, the crank chamber 32a, the passageway 63 of the drive shaft 34, the pressure evacuation passageway 49a, the suction chamber 33a, and the cylinder bores 31a is established. Since lubricating oil suspending in the refrigerating gas circulates through the above-mentioned circulating circuit, the interior of the compressor is lubricated by the circulating lubricating oil.

Since there is a pressure differential among the discharge chamber 33b, the crank chamber 32a, and the suction chamber 33a during the minimum angle of inclination of the swash plate 45, the differential pressure and provision of the small cross-sectional area of the pressure evacuation passageway 49a of the cap member 49 permit the swash plate 45 to stably stay at its minimum inclination angle position.

When the solenoid 65 is energized, the valve port 65c is closed by the valve element 65b. Thus, the communication between the discharge chamber 33b and the crank chamber 32a via the pressure supply passageway 64 is interrupted. Thus, the pressure prevailing in the crank chamber 32a is evacuated through the passageway 63 and the pressure evacuation passageway 49a, so that the pressure level within the crank chamber 32a is reduced. The reduction in the pressure level within the crank chamber 32a permits the swash plate 65 to move toward a larger inclination angle position.

In the above-described non-clutch type refrigerant compressor, a change in the load torque applied to the compressor is transmitted to the pulley 36 via the drive shaft 34, the power transmitting element 38, and the shock absorbent rubber element 42. Thus, the shock absorbent rubber element 42 is elastically deformed in respective outer and inner recesses 40b and 41b of the flanges 40a and 41a so as to absorb and attenuate the change of the load torque transmitted from the drive shaft 34 before the load torque is transmitted to the pulley 36. At this stage, the elastic deformation of the shock absorbent rubber element 42 should preferably occur equivalently in every portions thereof to effectively absorb the load torque.

In this connection, in the present first embodiment, the recesses 41b of the support plate 41 attached to the pulley 36 are arranged at a given interval in the circumferential direction of the pulley 36, and the recesses 40b of the support plate 40 attached to the power transmitting element 38 are arranged also at a given interval in the circumferential direction of the power transmitting element 38. Thus, the elastic deformation of the annular shock absorbent rubber element 42 dispersedly occurs in the respective recesses 40b and 41b arranged in the circumferential direction. Namely, the deformation of the annular shock absorbent rubber element 42 occurs equivalently in a plurality of portions thereof, and accordingly, an effective absorption of the change in the load torque applied to the compressor can be achieved.

Further, in the first embodiment, since the outer recesses 40b of the support plate 40 are circumferentially shifted with respect to the inner recesses 41b of the support plate 41, the annular absorbent rubber element 42 in positive engagement with the inner circumference of the flange 40a of the support plate 40 and with the outer circumference of the flange 41a of the support plate 41 can maintain a radial thickness thereof equivalent in every portion thereof. Accordingly, the elastic deformation of the shock absorbent rubber element 42 occurs equivalently in every circumferential portions thereof. This fact can further contribute to effective absorption of the change in the load applied to the compressor. Thus, transmission of shock to the pulley due to a change in a load torque applied to the compressor can be effectively attenuated.

It will be easily understood that since the shock absorbent rubber element 42 is arranged between the pulley 36 and the power transmission element 38 of the drive power transmission unit, the construction and arrangement for absorbing and attenuating a change in the load torque applied to the compressor can be very simple.

When the load torque applied to the compressor is excessive, if the excessive load torque is directly reversely transmitted to the automobile engine via the drive power transmission unit, either a stall of the automobile engine or damage to the belt 37 and the breakage of the compressor per se might occur. Nevertheless, in accordance with the drive power transmission unit of the first embodiment, convex portions 42a and 42b of the annular shock absorbent rubber element 42 which are in positive engagement with the recesses 40b and 41b of the flanges 40a and 41a of the support plates 40 and 41 are urged to disengage from the recesses 40b and 41b due to a large elastic deformation of the above-mentioned convex portions 42a and 42b of the shock absorbing rubber element 42. Accordingly, there occurs a slip between the outer and inner support plates 40 and 41 of the power transmission unit. Namely, the pulley 36 is disconnected from the power transmitting element 38 to interrupt transmission of the change in the load torque from the compressor to the pulley 36. Therefore, the excessive load is not directly transmitted from the compressor to the automobile engine, and the automobile engine does not stall, the belt 37 is not damaged, and breakage of the compressor does not occur.

Further, as described before, due to the circumferential shifting between the outward recesses 40b and the inward recesses 41b, the shock absorbent rubber element 42 is subjected to an elastic deformation equivalently distributed in every circumferential portion of the annular shock absorbent rubber element 42. Thus, the extent of the elastic deformation of the shock absorbent rubber element 42 in the radial direction thereof can be prevented from becoming large in every circumferential portion of the shock absorbent rubber element 42.

For example, when only one radially outward recess 40b of the support plate 40 and only one inward recess 41b of the support plate 41 are provided, an extent of the elastic deformation of the shock absorbent rubber element 42 becomes large.

When the depth of the radially outward recesses 40b and the radially inward recess 41b of the support plates 40 and 41 are very small, the convex portions 42a and 42b of the shock absorbent rubber element 42 might easily come out of the engagement with the recesses 40b and 41b even when the change in the load torque is rather small. Thus, the depth of the recesses 40b and 41b must be relatively deep. However, a large depth of the recesses 40b and 41b makes the shock absorbent rubber element 42 difficult to be disengaged from the outward and inward recesses 40b and 41b of the support plates 40 and 41 even when an excessive load torque is applied to the compressor, and, accordingly, makes it impossible to interrupt transmission of the load torque from the compressor to the pulley 36 of the drive power transmission unit.

In the described first embodiment of the present invention, equivalent elastic deformation of the annularly extending wave-shape shock absorbent rubber element 42 occurs in every circumferential portion of the shock absorbent rubber element 42, and thus, the extent of radial deformation of the rubber element 42 can be small. Accordingly, the depth of the outward and inward recesses 40b and 41b of the support elements 40 and 41 can be small. Consequently, when an excessive load torque is applied to the compressor, the positive engagement of the absorbent rubber element 42 and the flanges 40a and 41a of the support plates 40 and 41 can be appropriately broken, and the transmission of the load torque from the compressor to the pulley 36 of the drive power transmitting unit can be surely interrupted. It should be understood that the annularly extending wave-shape shock absorbent rubber element 42 having convex portions 42a and 42b can be easily produced by a conventional casting method.

The drive shaft 34 of the compressor is usually preloaded in the axial direction to prevent an axial play thereof. In the compressor of the first embodiment, an axial preload is applied by the spring element 43 to the drive shaft 34 in a frontward direction, i.e., a direction in which a front end of the drive shaft 34 extends from the front housing 32. The preload is received by the inner face of the front housing 32 via the thrust bearing 57. The spring element 43 in the shape of a Belleville washer applies the preload to the drive shaft 34 via the angular type bearing 35, the pulley 36, the shock absorbent rubber element 42, and the power transmitting element 38. Namely, the shock absorbent rubber element 42 functions not only to absorb and attenuate the change in the load torque applied to the compressor but also to transmit the preload from the spring element 43 to the drive shaft 34. The preload provided by the spring element 43 can be easily adjusted by screwing and unscrewing the nut element 39 threadedly engaged with the frontmost end of the drive shaft 34.

Figure 5:
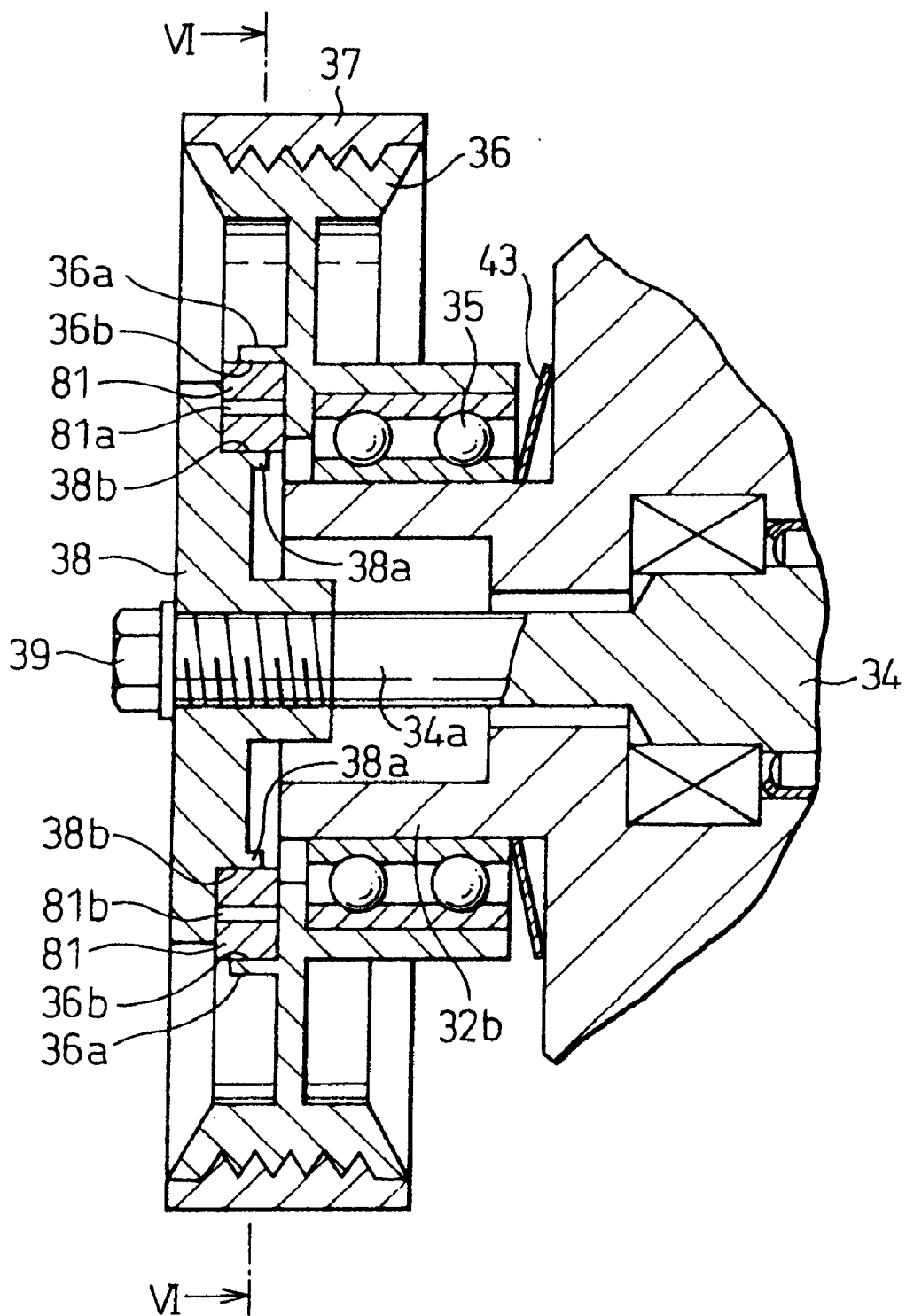
FIG. 5 is a cross-sectional view of the drive power transmission unit for a refrigerant compressor, according to a second embodiment of the present invention.
Figure 6:
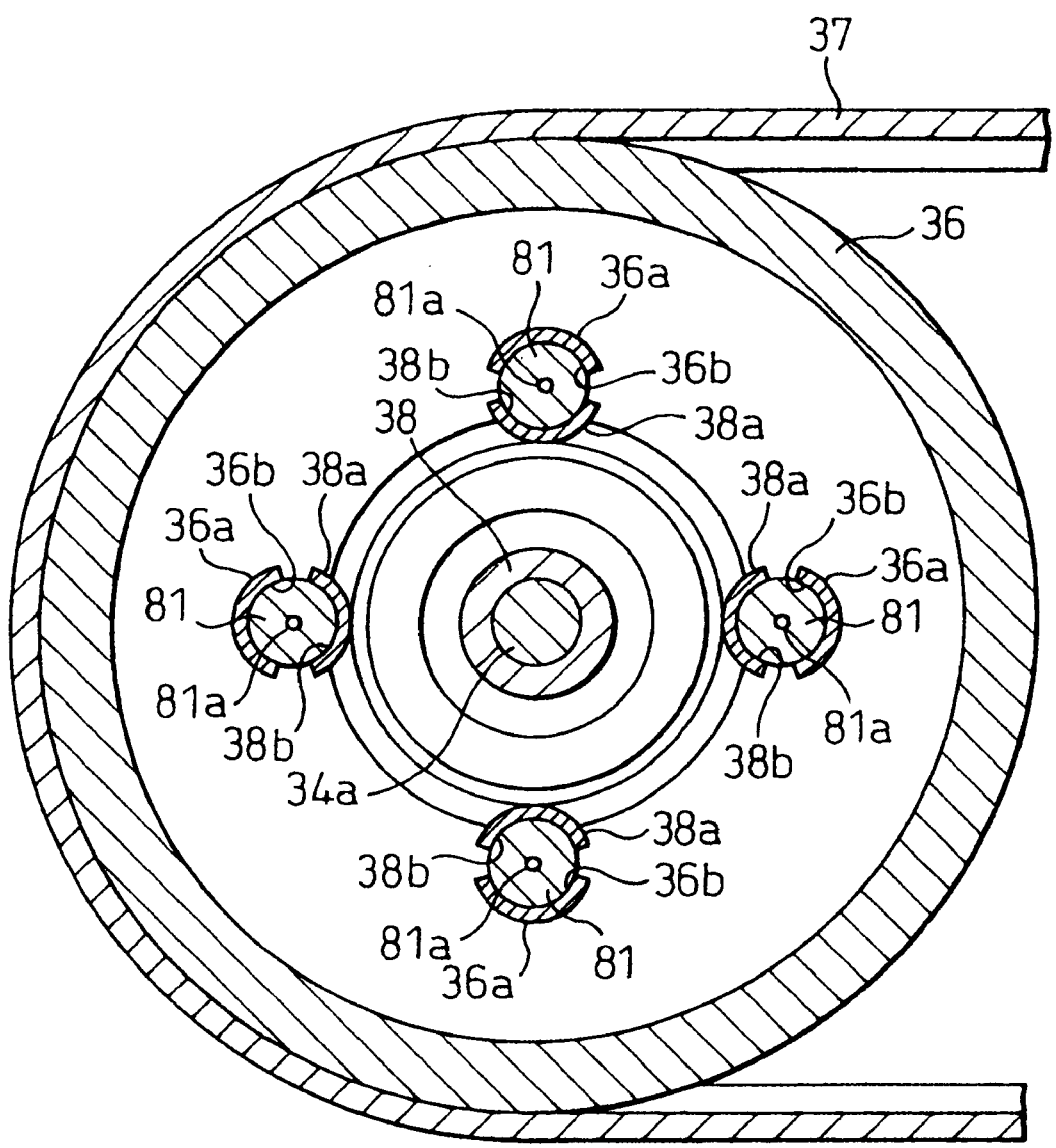
FIG. 6 is a cross-sectional view of the drive power transmission unit, taken along the line VI—VI of FIG. 5.

Referring to FIGS. 5 and 6, illustrating an important portion of a drive power transmission unit for a refrigerant compressor according to a second embodiment of the present invention, the same or similar elements are designated by the same reference numerals as those of the first embodiment of FIGS. 1 through 4. In FIGS. 5 and 6, a pulley 36 is freely rotatably mounted around a drive shaft 34 via a double-row angular type bearing 35. A power transmitting element 38 of the drive power transmission unit is fixedly attached to the frontmost end of the drive shaft 34. The former pulley 36 is provided with a plurality of (four) round support seats 36a, and the latter power transmitting element 38 is provided with a plurality of (four) round support seats 38a which are arranged so as to confront respective annular support seats 36a of the pulley 36 via a cylindrical space left therebetween.

The drive power transmission unit is further provided with a plurality of (four) cylindrical shock absorbent rubber elements 81 fitted in the respective cylindrical spaces between the four pairs of the round support seats 36a and 38a. Namely, respective cylindrical shock absorbent rubber elements 81 are in positive engagement with recessed portions 36b of respective support seats 36a of the pulley 36 and recessed portions 38b of respective support seats 38a of the power transmitting element 38.

It should be understood that the support seats 36a of the pulley 36 and the support seats 38a of the power transmitting elements 38 confront radially with respect to the center of the pulley 36. The four cylindrical shock absorbent rubber elements 81 are provided with a central hole 81a, respectively.

In the described second embodiment, the shock absorbent rubber elements 81 can elastically deform so as to absorb a change in a load torque applied to the compressor before the change in the load torque is transmitted to the pulley 36. Thus, transmission of any shock from the compressor to the external drive power source can be prevented by the drive power transmission unit. The shock absorbent rubber elements 81 of the drive power transmission unit of the second embodiment also function to transmit a preload from the spring element 43 to the drive shaft 34. When an excessive load torque is applied to the compressor, the respective shock absorbent rubber elements 81 are elastically deformed so as to come out of the positive engagement with either the support seats 36b or the support seats 38b. Thus, the pulley 36 receiving a drive power from the external drive power source such as an automobile engine slips from one position, where the pulley 36, the shock absorbent rubber elements 81, and the power transmitting element 38 are normally engaged, to the next normally engaged position. Accordingly, the excessive load torque is not reversely transmitted from the power transmitting element 38 to the pulley 36. The central holes 81a of the respective shock absorbent rubber elements 81 can promote a smooth elastic deformation of the shock absorbent rubber elements 81 when the excessive load torque is applied to the compressor. It will be easily understood that the arrangement of the cylindrical shock absorbent rubber elements in the respective cylindrical spaces of the support seats 36a and 38a of the pulley 36 and the power transmitting element 38 can be easily achieved without difficulty.

The third embodiment of the present invention is described hereinafter with reference to FIG. 7 in which the same elements or parts as the previous embodiments are designated by the same reference numerals.

Figure 7:
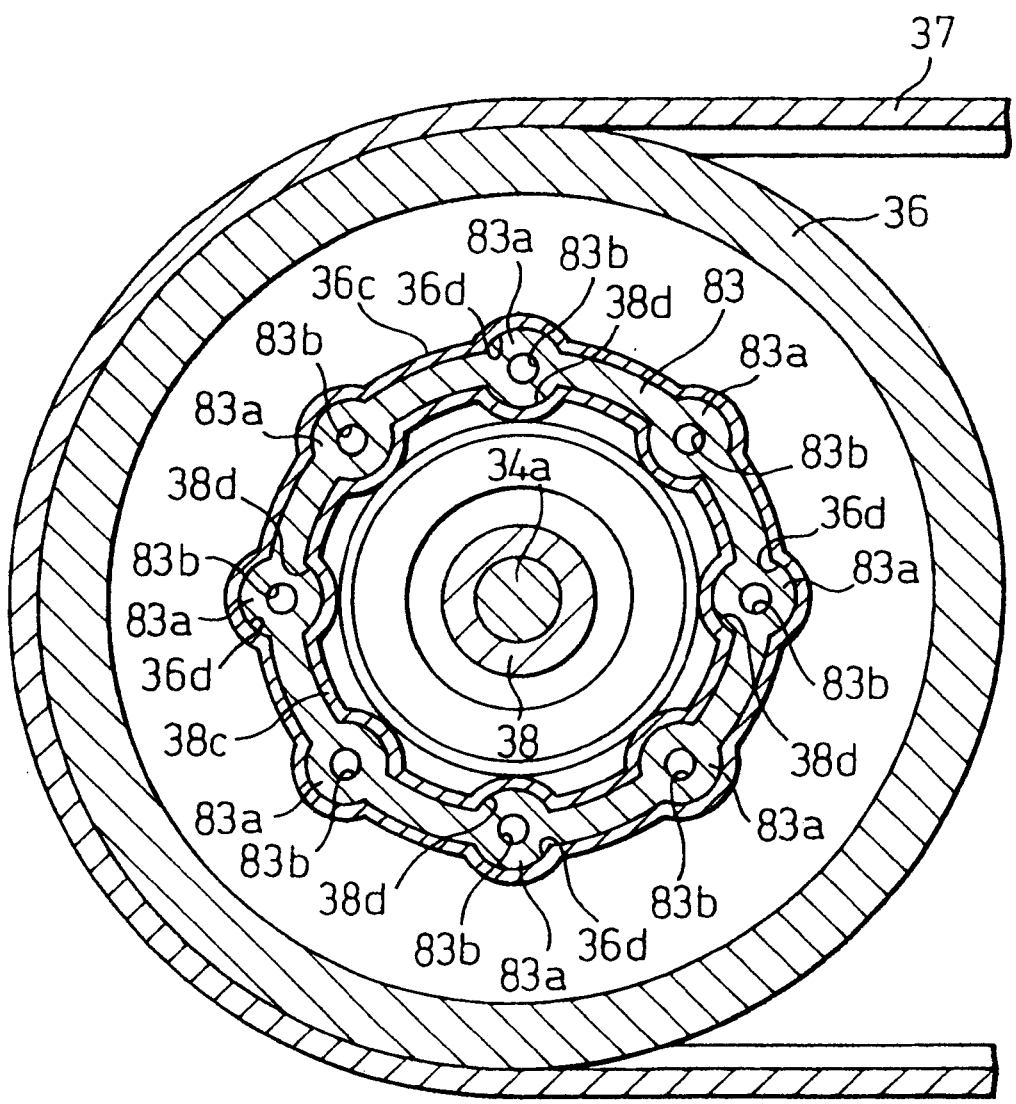
FIG. 7 is a cross-sectional view of the drive power transmission unit for a refrigerant compressor, according to a third embodiment of the present invention.

In FIG. 7, a drive power transmission unit for a refrigerant compressor according to the third embodiment includes a pulley 36 freely rotatably mounted around a frontmost portion 34a of the drive shaft of the compressor, and a power transmitting element 38 fixedly attached to the front end of the same drive shaft. The pulley 36 and the power transmitting element 38 radially confront one another, and provide a pair of generally cylindrical portions 36c and 38c extending axially. The cylindrical portion 36c of the pulley 36 has an inner circumferential face provided with a plurality of radially outwardly concave recesses 36d, and the cylindrical portion 38c of the power transmitting element 38 has an outer circumferential face provided with a plurality of radially inwardly concave recesses 38d. The recesses 36d are arranged to be angularly spaced apart from one another. Similarly, the recesses 38d are arranged to be spaced apart from one another. An annular shock absorbent rubber element 83 is positively engaged between the pair of cylindrical portions 36c and 38c. Namely, the annular shock absorbent rubber element 83 has a plurality of radially bulged portions 83a fitted in the recesses 36d and 38d to provide a positive engagement between the pulley 36 and the shock absorbent rubber element 83, and between the shock absorbent rubber element 83 and the power transmitting element 38 so that an external drive force is transmitted from the pulley 36 to the power transmitting element 38. Nevertheless, the annular shock absorbent element 83 is elastically deformable. Each bulged portion 83a of the shock absorbent element 83 is provided with an axial hole 83b formed therethrough to promote a smooth elastic deformation of the annular shock absorbent rubber element 83. Therefore, when a load torque is applied to the compressor, the load torque is reversely transmitted from the power transmitting element 38 to the pulley 36 after being sufficiently absorbed and attenuated by the shock absorbent rubber element 83. Namely, the pulley 36 does not receive a shock from the compressor even when a change in a load torque applied to the compressor occurs, and accordingly, no adverse affect is provided on the external drive source power. Further, since the elastic deformation of the shock absorbent rubber element 83 does not locally occur and is distributed circumferentially due to the annular shape of the rubber element 83, and due to the provision of a plurality of angularly distributed bulged portions 83a, the shock absorbing action of the shock absorbent rubber element 83 can be ensured and appropriate.

Further, when an excessive load torque is applied to the compressor, the elastic deformation of the plurality of bulged portions 83a breaks the positive engagement between the shock absorbent rubber element 83 and at least one of the pulley 36 and the power transmitting element 38. Namely, the bulged portions 83a are disengaged from at least one of the recesses 36d and 38d, and accordingly, the pulley slips with respect to the power transmitting element 38 and, in turn, the drive shaft 34. It should be understood that the axial holes 83b of the rubber element 83 can promote smooth elastic deformation thereof when the excessive load torque is applied to the compressor.

When the pulley 36 slips without transmitting drive power to the drive shaft 34, the annular shock absorbent rubber element 83 must slide relative to one of the pulley 36 and the power transmitting element 38. Particularly, the bulged portions 83a of the rubber element 83 slide relative to the cylindrical portion 38c of the power transmitting element 38. Thus, the rubber element 83 may be abraded and damaged to shorten the life of operation of the shock absorbent rubber element 83. However, when the annular shock absorbent element 83 is formed so that the spacing between the neighboring bulged portions 83a is as small as possible, the sliding motion of the shock absorbent rubber element 83 can be an intermittent sliding motion. Thus, the abrasion of and damage to the shock absorbent rubber element 83 can be reduced.

In the third embodiment, the shock absorbent element 83 is formed in an annular member to have integrally connected bulged portions 83a, and accordingly, the shock absorbing effect of the rubber element 83 can be larger than that provided by the shock absorbent rubber element consisting of a plurality of individual cylindrical rubber elements 81 of the second embodiment of FIGS. 5 and 6. It will be easily understood that the arrangement of the annular shock absorbent element 83 of FIG. 7 between the pulley 36 and the power transmitting element 38 can be very simple.

Figure 8:
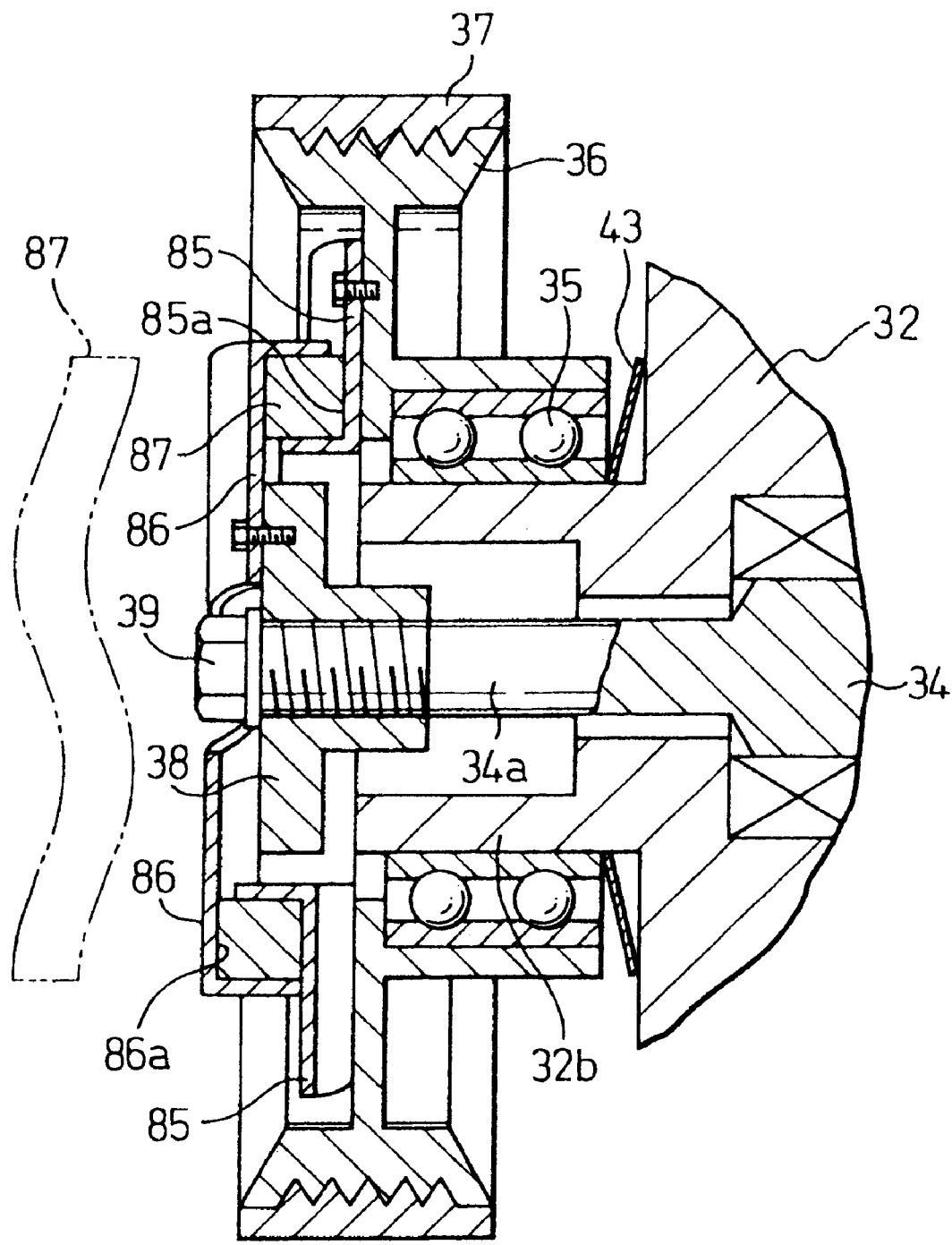
FIG. 8 is a cross-sectional view of the drive power transmission unit for a refrigerant compressor, according to a fourth embodiment of the present invention.

FIG. 8 illustrates the fourth embodiment of the present invention, in which a drive power transmission unit is provided with a pulley 36 freely rotatably mounted around a drive shaft 34 via a double-row angular type bearing 35, and a power transmitting element 38 fixedly attached to the end of the drive shaft 34 in a similar manner to the first embodiment. Further, a support plate 85 is attached to the pulley 36, and a different support plate 86 is attached to the power transmitting element 38. An annular shock absorbent rubber element 87 is arranged between the two support plates 85 and 86. As shown by a chain line, the shock absorbent rubber element 87 is wavy with respect to a flat plane perpendicular to the axis of the drive shaft 34, and is arranged between the two support plates 85 and 86 so as to be positively engaged with recesses 85a of the support plate 85 and recessed 86a of the support plate 86. Namely, the pulley 36 and the power transmitting element 38 are operatively engaged with one another to ordinarily transmit a drive power of an external drive power source from the pulley 36 to the drive shaft 34 via the shock absorbent rubber element 87 and the power transmitting plate 38. When a change in a load torque applied to the compressor occurs, the shock absorbent rubber element 87 is elastically deformed so as to absorb the torque change. Thus, a shock transmitting from the compressor to the pulley 36 of the power transmission unit is attenuated by the shock absorbent rubber element 87.

When an excessive load torque is applied to the compressor, the shock absorbent rubber element 87 is elastically deformed to disengage from the recesses 85a or 86a, and accordingly, the pulley 36 slips with respect to the power transmitting element 38. Thus, the excessive load torque applied to the compressor does not adversely affect the external drive power source, i.e., an automobile engine. Namely, the same advantageous effect as the drive power transmission unit of the first embodiment can be obtained by the unit of the present fourth embodiment of FIG. 8.

Figure 9:
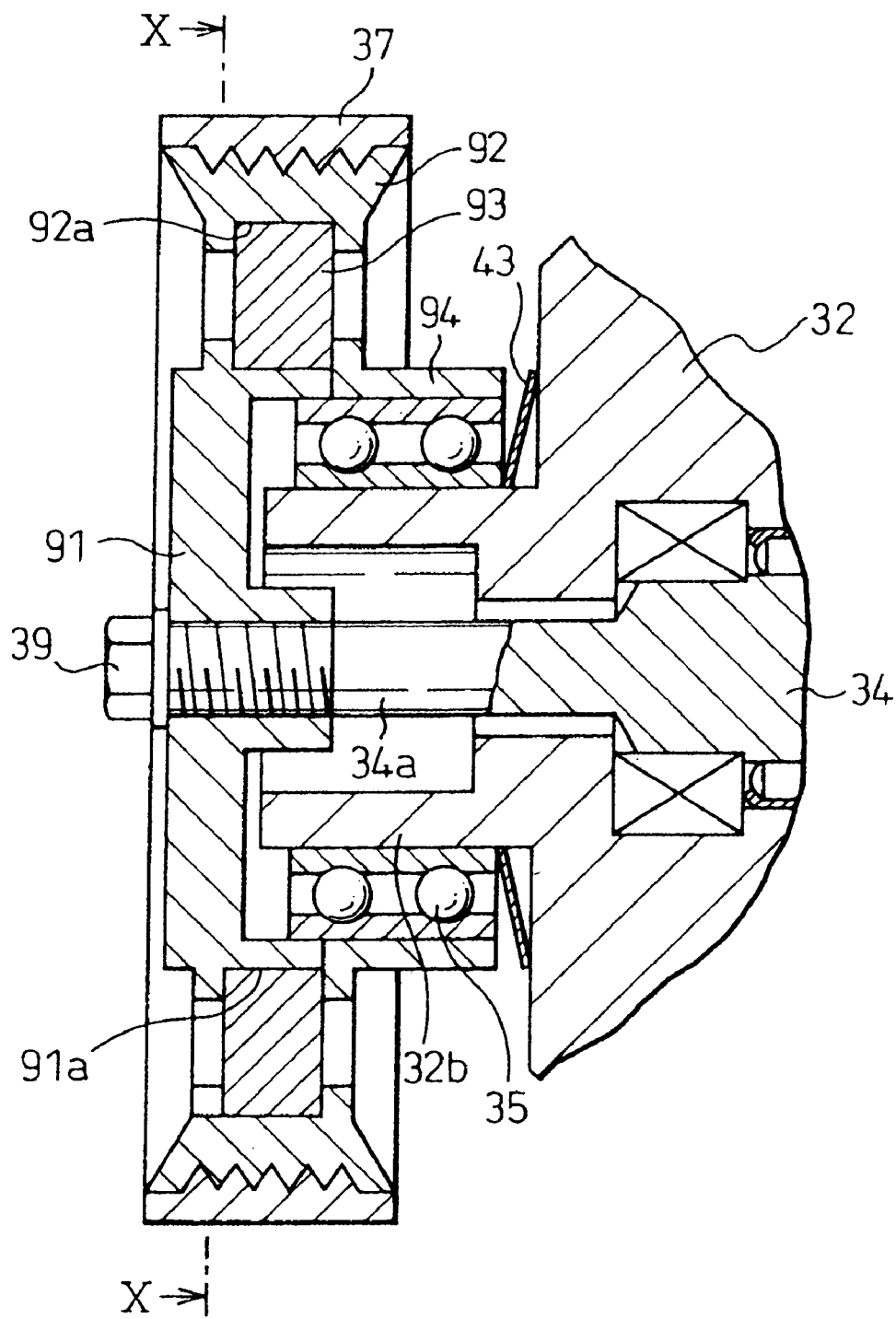
FIG. 9 is a cross-sectional view of the drive power transmission unit for a refrigerant compressor, according to a fifth embodiment of the present invention.
Figure 10:
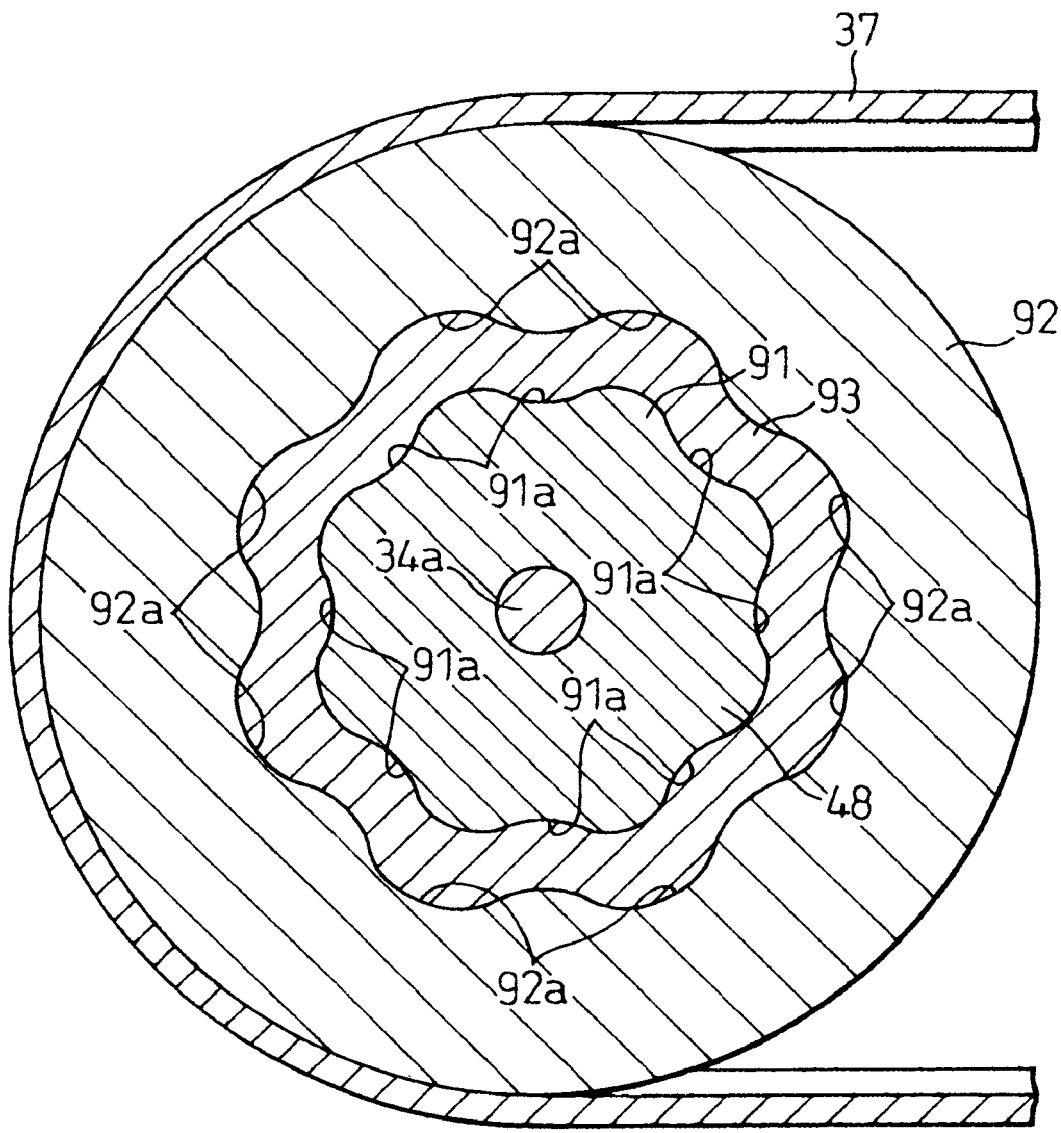
FIG. 10 is a cross-sectional view of the drive power transmission unit, taken along the line X—X of FIG. 9.

FIGS. 9 and 10 illustrate a drive power transmission unit according to a fifth embodiment of the present invention, wherein the same or similar elements and parts as those of the first embodiment are designated by the same reference numerals.

Referring to FIGS. 9 and 10, a power transmitting element 91 of the drive power transmission unit is threadedly engaged with the frontmost portion 34a of a drive shaft 34, and is supported by the cylindrical support portion 32b of a front housing 32. A pulley 92 is mounted around the frontmost portion 34a of the drive shaft 34, and is provided with an inner annular face having an annular groove and confronting the outer circumferential face of the power transmitting element 91. The pulley 92 receives a drive power from an external drive power source (not shown) via a belt 37.

A shock absorbent rubber element 93 is arranged between the inner cylindrical face of the pulley 92 and the outer cylindrical face of the power transmitting element 91 to provide a positive engagement between the pulley 92 and the power transmitting element 91. The shock absorbent rubber element 93 is fitted in the annular groove of the pulley 92 so as to be prevented from moving in a direction parallel with the axis of the drive shaft 34. The shock absorbent rubber element 93 is further sandwiched between a position setting ring 94 fixed to the outer race of the double-row angular type bearing 35 and the power transmitting element 91. The shock absorbent rubber element 93 has the same outer shape as the rubber element 42 of the first embodiment of FIGS. 2A and 2B, and is positively engaged in the respective recesses 92a of the pulley 92 and the respective recesses 91a of the power transmitting element 91 to be elastically deformed. Thus, when an excessive load torque is applied to the compressor, the shock absorbent rubber element 93 is elastically deformed so as to disengage from the recesses 91a or 92a. Therefore, the pulley 92 slips with respect to the power transmitting element 91, and accordingly, the excessive load torque is not transmitted to the pulley 92 and in turn the external drive power source. The arrangement of the rubber element 93 between the pulley 92 and the power transmitting element 91 is very simple.

Figure 11:
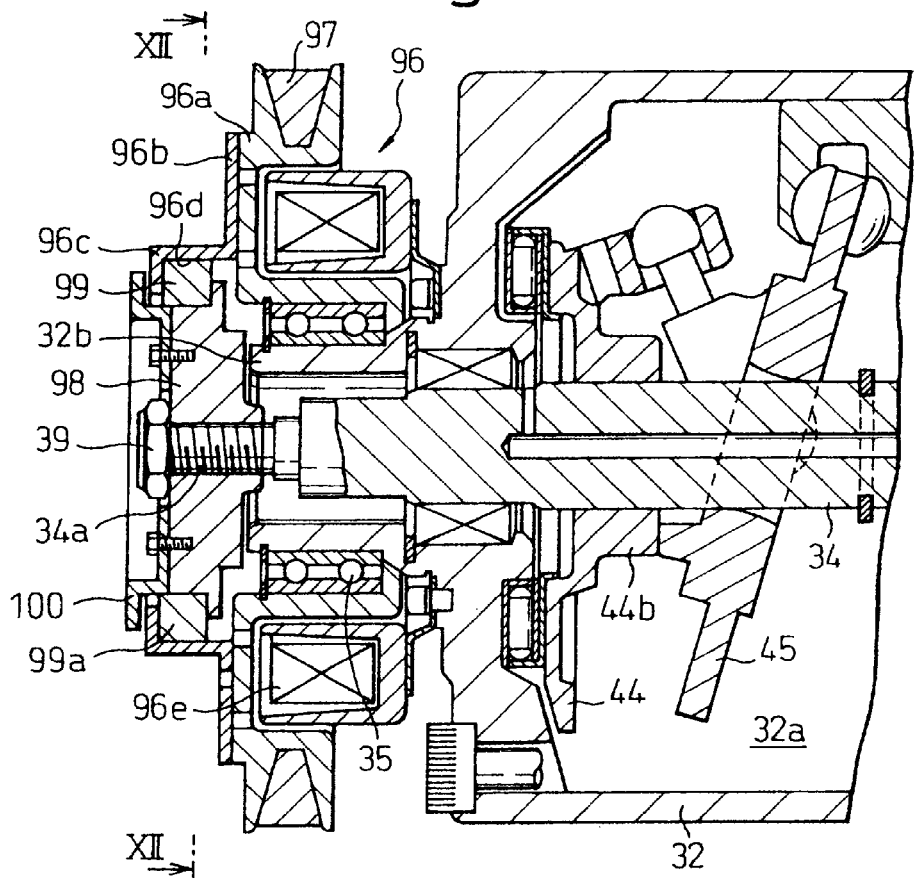
FIG. 11 is a longitudinal cross-sectional view of a transmission unit and a part of a refrigerant compressor, according to sixth embodiment of the present invention.
Figure 12:
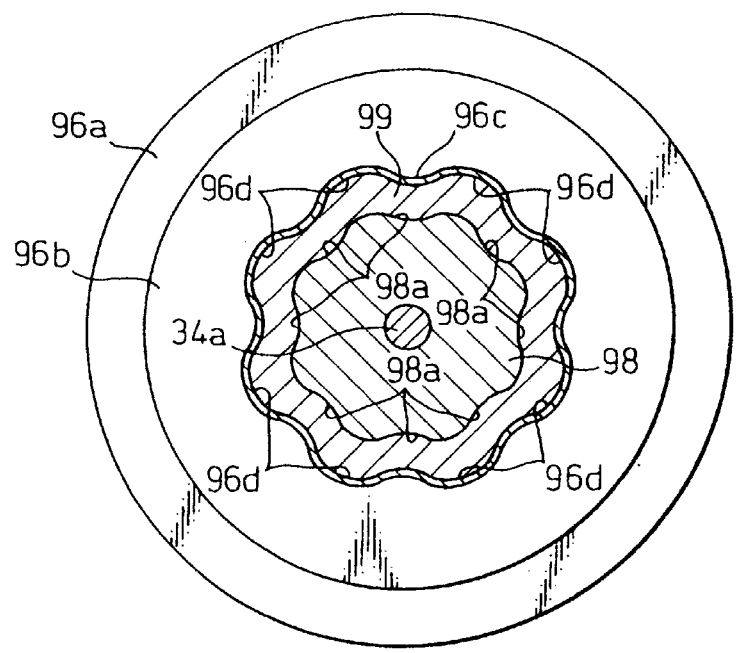
FIG. 12 is a cross-sectional view of the drive power transmission unit, taken along the line XII—XII of FIG. 11.

FIGS. 11 and 12 illustrate a sixth embodiment of the present invention, wherein the construction and operation of a drive power transmission unit for a refrigerant compressor incorporating therein a solenoid clutch is described. Nevertheless, it should be noted that the same and like elements or parts as those of the first embodiment are designated by the same reference numerals.

In FIGS. 11 and 12, the drive power transmission unit is provided with a solenoid clutch 96 arranged between the frontmost portion 34a of a drive shaft 34 of the compressor and the cylindrical support portion 32b of a front housing 32. A pulley 96a capable of acting as a clutch plate on the drive side is operatively connected to an external drive power source, i.e., an automobile engine (not shown) via a belt 97. The pulley 96a is rotatably supported on the cylindrical supporting portion 32b of the front housing 32 via a double-row angular type bearing 35.

A power transmitting element 98 is threadedly engaged with the frontmost end of the drive shaft 34 and clamped by a nut 39. The power transmitting element 98 has an outer circumference on which an annular shock absorbent rubber element 99 is fitted. It should be noted that the annular shock absorbent rubber element 99 may have the same shape as that of the rubber element 42 of the first embodiment shown in FIGS. 2A and 2B. The shock absorbent rubber element 99 has an outer circumference thereof on which a clutch plate 96b on the driven side is fitted and supported. The clutch plate 96b on the driven side is provided with an integral support flange 96c extending frontward from an inner circumference of the clutch plate 96b. The support flange 96c has a plurality of radially outwardly concaved recesses 96d arranged to be angularly spaced from one another by a given spacing.

The power transmitting element 98 is provided with an outer circumference formed to have a plurality of radially inwardly concaved recesses 98a therein which are circumferentially shifted with respect to the recesses 96d of the support flange 96c. The shock absorbent rubber element 99 is arranged between the support flange 96c of the clutch plate 96b and the outer circumference of the power transmitting element 98 to provide a positive engagement between the rubber element 99 and the clutch plate 96b, and between the clutch plate 96b and the power transmitting element 98. Namely, the convexed portions of the outer and inner faces of the shock absorbent rubber element 99 are engaged in the recesses 96d and 98a.

A stop element 100 is attached to the front face of the power transmitting element 98 so as to prevent the clutch plate 96b from being disengaged from the shock absorbent rubber element 99.

When the solenoid 96e of the solenoid clutch 96 is energized, the clutch plate 96b on the driven side is magnetically attracted to and comes in tight contact with the side face of the pulley 96a acting as the clutch plate on the drive side against the elasticity of the shock absorbent rubber element 99. On the other hand, when the solenoid 96e of the solenoid clutch 96 is de-energized, the clutch plate 96b is separated from the pulley 96a by the elastic force of the rubber element 99.

When the clutch plate 96b is in tight contact with the side face of the pulley 96a, the shock absorbent rubber element 99 exhibits a load torque attenuating effect similar to that exhibited by the shock absorbent rubber element 42 of the first embodiment of FIGS. 2A and 2B. When an excessive load torque is applied to the compressor, the shock absorbent rubber element 99 is elastically deformed to disengage from the support flange 96c of the clutch plate 96b or the power transmitting element 98, so that transmission of the excessive load torque from the compressor to the pulley 96a and in turn to the external drive power source is prevented in a similar manner to the embodiment of the first embodiment.

Figure 13:
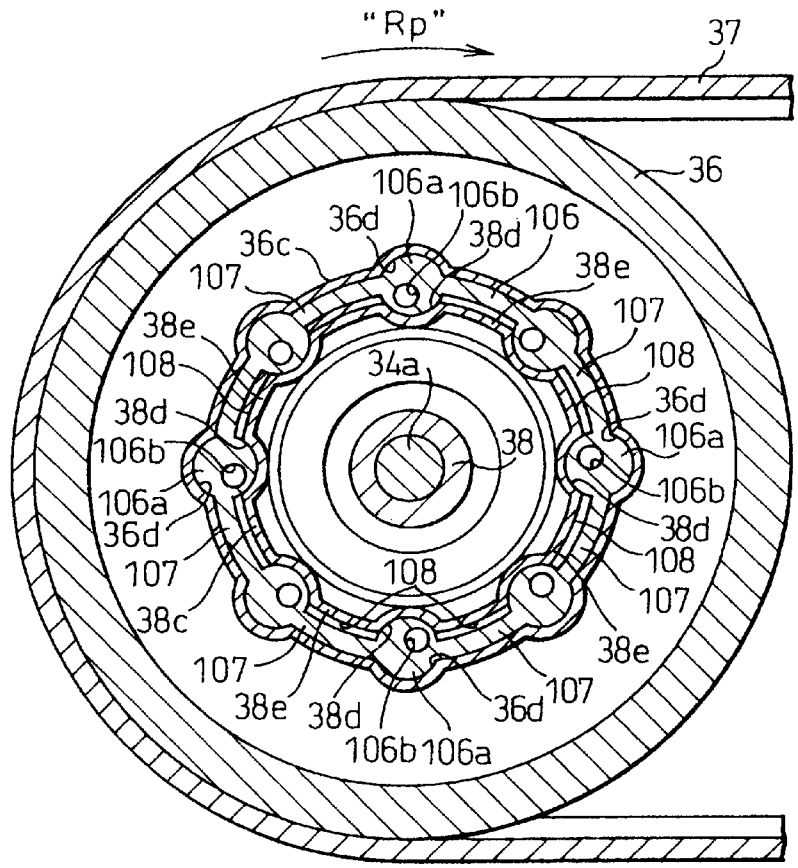
FIG. 13 is a cross-sectional view of a drive power transmission unit according to a seventh embodiment of the present invention.

FIGS. 13 and 14 illustrate a seventh embodiment of the present invention, which is different from the third embodiment of FIG. 7 in that the construction of a shock absorbent rubber element 106 is modified from that of the shock absorbent rubber element 83 of the third embodiment. Namely, in the shock absorbent rubber element 106, a plurality of radially bulged portions 106a are provided with axial through-holes 106b respectively bored at positions deviated from the center of the respective bulged portions 106a. More particularly, the respective axial through-holes 106b are arranged at positions deviated from the center of the bulged portions 106a by a given distance in a direction reverse to the rotating direction "Rp" of the pulley 36.

The shock absorbent rubber element 106 is further provided with portions 107 (referred to as a connecting portion herein below), which provide a physical interconnection between the two neighboring radially bulged portions 106a. The respective connecting portions 107 have a radial width which is smaller than that of the shock absorbent rubber element 83 of the third embodiment, and accordingly, a radial spacing 108 is provided between a radially inner side of the connecting portions 107 and non-recess portions 38e of a cylindrical portion 38c of a power transmitting element 38.

The operation of the above-described drive power transmission unit according to the seventh embodiment is described below with reference to FIGS. 14A and 14B together with FIG. 13.

Figure 14A:
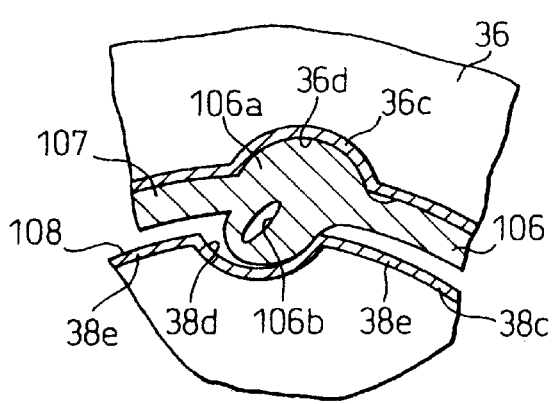
FIG. 14A is a cross-sectional partial view of the drive power transmission unit of FIG. 13, illustrating a shock absorbent rubber element at an ordinary operating condition of the transmission unit.

As shown in FIG. 14A, in the ordinary operating condition of the drive power transmission unit, the shock absorbent rubber element 196 which is in a positive engagement with the concave recesses 36d of the pulley 36 and the concave recesses 38d of the power transmitting element 38 is elastically deformed to absorb and attenuate a change in a load torque applied to the compressor before the torque change is transmitted to the pulley 36, and in turn to the external drive power source. Thus, the axial through-holes 106b are collapsed.

Figure 14B:
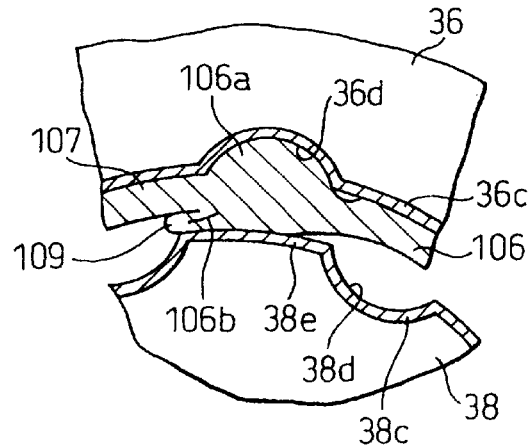
FIG. 14B is cross-sectional partial view of the drive power transmission unit of FIG. 13, illustrating a shock absorbent rubber element at an excessive load operating condition of the transmission unit.

When an excessive load torque is applied to the compressor, the bulged portions 106a of the shock absorbent rubber element 106 are elastically greatly deformed to mainly disengage from the concaved recesses 38d of the power transmitting element 38 as shown in FIG. 14B. Thus, the pulley 36 slips, and accordingly, transmission of the excessive torque from the compressor to the pulley 36 can be interrupted. At this stage, since the axial through-holes 106b are arranged to be deviated from the center of the bulged portions 106a in the reverse direction with respect to the rotating direction of the pulley 36, portions of the respective bulged portions 106a adjacent to the axial through-holes 106b are easily collapsed when a predetermined excessive load torque is applied the compressor, and accordingly, the interruption of transmission of the excessive load torque is ensured. Further, when the respective bulged portions 106a are elastically deformed to disengage from the recesses 38d, protrusions 109 (see FIG. 14B) of the shock absorbent rubber element 106 which occur due to collapse of the respective bulged portions 106a can be small so as to prevent a damage to the rubber element 106. Further, the provision of the aforementioned radial spacing 108 permits the protrusions 109 of the shock absorbent rubber element 106 to enter therein. Therefore, if the protrusions 109 are caught between the pulley 36 and the non-recess portions 38e of the power transmitting element during the elastic deformation of the shock absorbent rubber element 106, elastic reaction force exhibited by the shock absorbent rubber element 106 against the pulley 36 and the power transmitting element 38 does not greatly increase, and the transmission of an excessive load torque applied to the compressor due to the catching of the protrusions 109 of the radially bulged portions 106a of the rubber element 106 is not transmitted from the compressor to the pulley 36, and in turn to the external drive power source. Namely, it is possible to stably prevent transmission of an excessive load torque to the external drive power source when the excessive load torque reaches a predetermined torque level.

Figure 15:
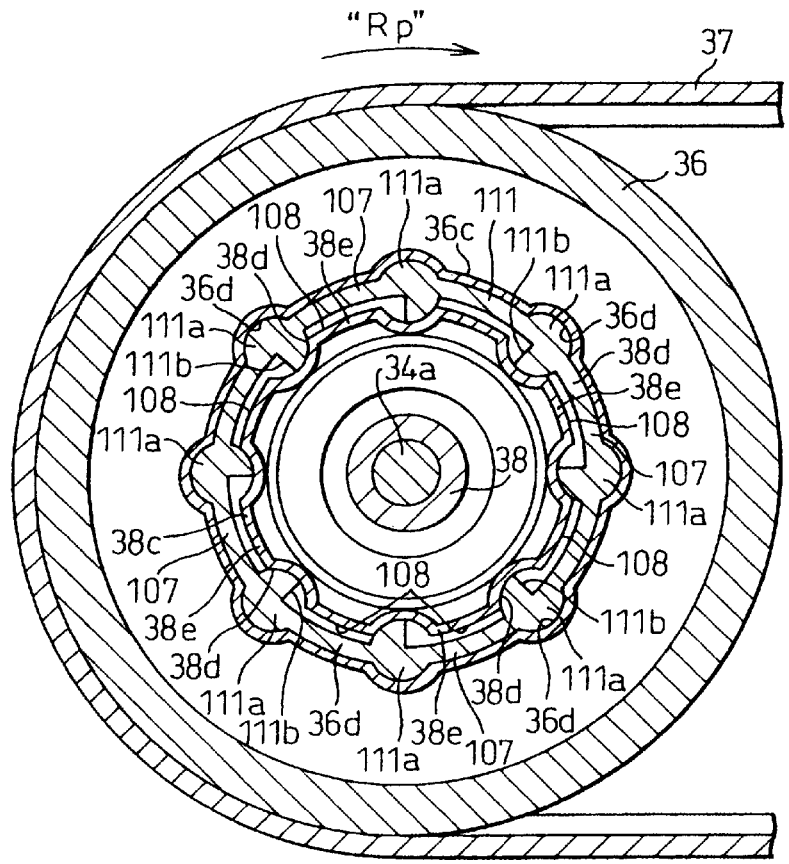
FIG. 15 is a cross-sectional view of a drive power transmission unit according to an eighth embodiment of the present invention.
Figure 16A:
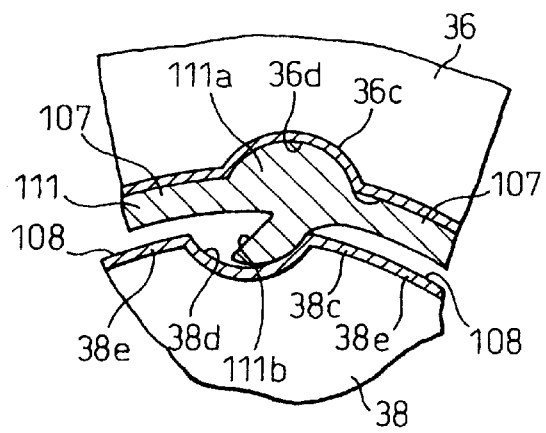
FIG. 16A is a cross-sectional partial view of the drive power transmission unit of FIG. 15, illustrating a shock absorbent rubber element at an ordinary operating condition of the transmission unit.
Figure 16B:
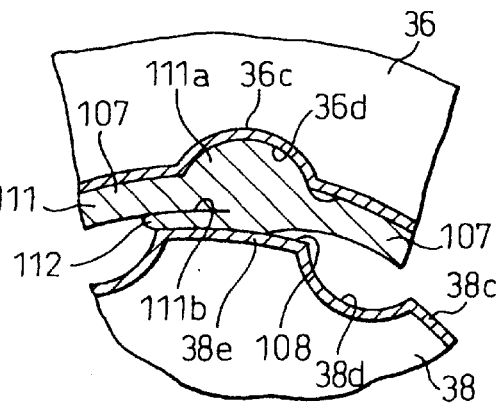
FIG. 16B is cross-sectional partial view of the drive power transmission unit of FIG. 15, illustrating a shock absorbent rubber element at an excessive load operating condition of the transmission unit.

FIGS. 15, 16A, and 16B illustrate an eighth embodiment of the present invention.

The drive power transmission unit of the eighth embodiment is different from the embodiment of FIG. 13 only in that a shock absorbent rubber element 111 has a plurality of radially bulged portions 111a the construction of which is modified from that of the bulged portions 106a of the shock absorbent 106 of the seventh embodiment.

Referring to FIG. 15, the bulged portions 111a of the shock absorbent rubber element 111 are formed with respective cut-portions 111b at rear end positions thereof in relation to the rotating direction "Rp" of the pulley 36. Each cut-portion 111b functions as a container for a tongue portion adjacent to the cut-portion 111b.

As shown in FIG. 16A, during the ordinary operation of the drive power transmission unit, the shock absorbent rubber element 111 is elastically deformed between the recesses 36d and 38d to absorb a change in a load torque applied to the compressor before the torque change is transmitted from the compressor to the pulley 36 and the external drive power source.

As shown in FIG. 16B, when an excessive load torque is applied to the compressor, the radially bulged portions 111a of the rubber element 111 are elastically greatly deformed to disengage mainly from the recesses 38d of the power transmitting element 38. Thus, the pulley 36 rotates idle in relation to the power transmitting element 38. At this stage, the cut-portions 111b of the shock absorbent rubber element 111 permit the tongue portions of the shock absorbent rubber element 111 to be immediately deformed when a predetermined excessive load torque is applied to the compressor, and accordingly, transmission of the excessive load torque from the compressor to the pulley 36 of the drive power transmission unit can be surely prevented. Further, protrusions 112 (see FIG. 16B) of the bulged portions 111a caused by the elastic deformation of the rubber element 111 can have the smallest possible volume. Further, similar to the seventh embodiment, since a spacing 108 is formed between the connecting portions 107 of the shock absorbent rubber element 111 and the non-recess portions 38e of the power transmitting element 38, the protrusions 112 of the bulged portions 111a of the rubber element 111 can be received in the spacing 108 during the elastic deformation of the respective bulged portions 111a. Thus, if the protrusions 112 are caught between the pulley 36 and the non-recess portions 38e of the power transmitting element 38, the elastic reaction force acting from the shock absorbent rubber element 111 to the pulley 36 and the power transmitting element 38 does not greatly increase. Thus, an excessive load torque caused by the seizing of the protrusions 112 of the shock absorbent rubber element 111 between the pulley 36 and the non-recess portions 38e of the power transmitting element 38 is not transmitted to the pulley 36, and in turn to the external drive power source. Namely, it is possible to stably prevent or interrupt transmission of an excessive load torque to the external drive power source when the excessive load torque reaches a predetermined torque level.

Figure 17:
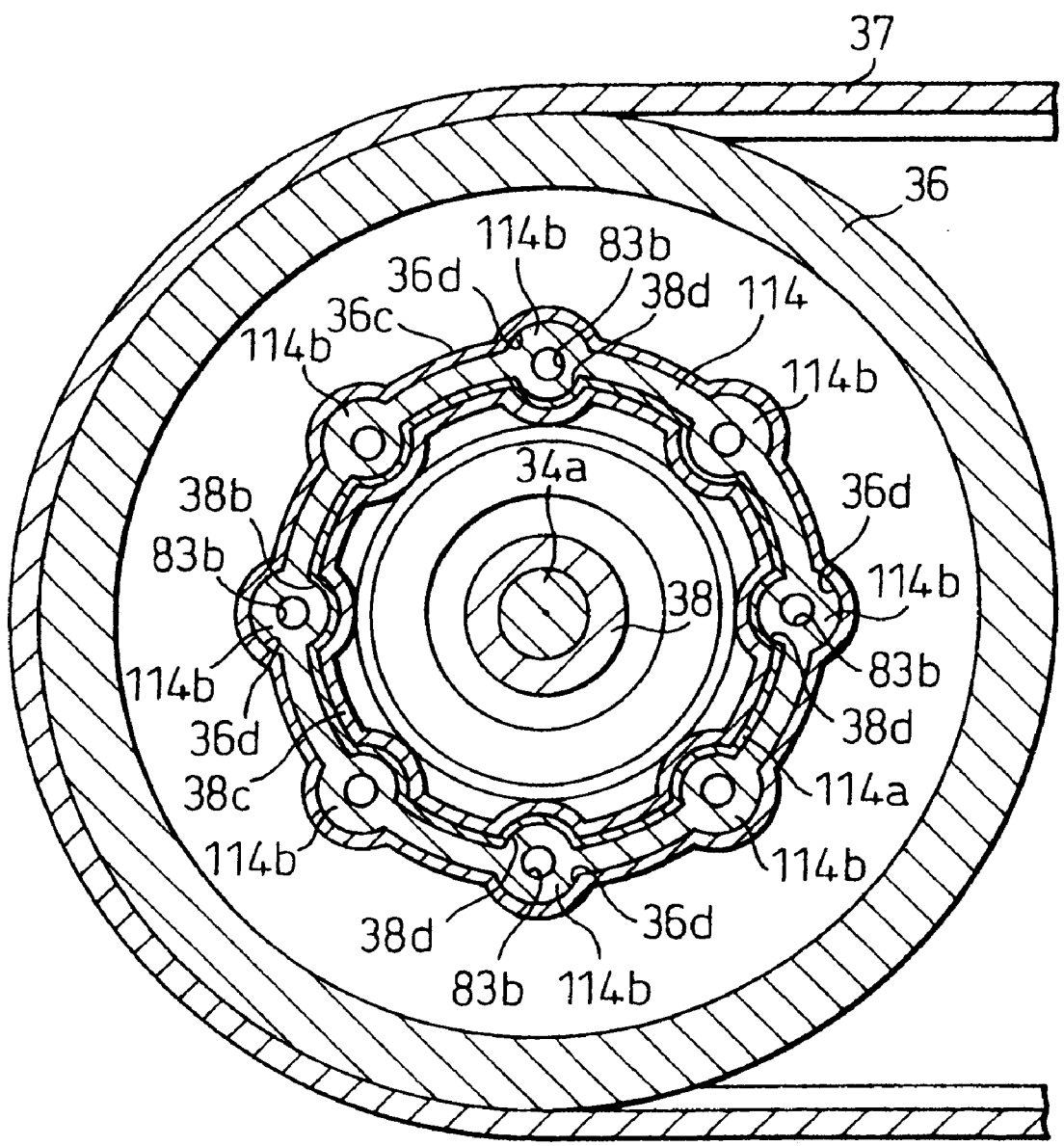
FIG. 17 is a cross-sectional view of a drive power transmission unit according to a ninth embodiment of the present invention.

FIG. 17 illustrates a ninth embodiment of the present invention, which is different from the third embodiment of FIG. 7 in that a shock absorbent rubber element 114 different from the rubber element 83 of the third embodiment is coated with a layer of a substance having a stable coefficient of friction.

In FIG. 17, the shape of the shock absorbent rubber element 114 is substantially the same as that of the shock absorbent rubber element 83 of FIG. 7, and is made of a synthetic rubber material selected from butyl rubber, butadiene rubber, isoprene rubber, styrene-butadiene rubber, acrylonitorile-butadiene rubber, chloroprene rubber, urethane rubber, ethylene-propylene diene rubber, and diverse kinds of thermoplastic elastomers. A radially inner face of the shock absorbent rubber element 114 is coated with a layer of a substance 114*a* having a good sliding property and a stable coefficient of friction. The substance 114*a* may be one of synthetic rubbers such as silicone rubber, fluorine-contained rubber, and tetrafluoroethylene-propylene rubber. It should be understood that the thickness of the layer of substance 114*a* in FIG. 17 is shown to be thicker than a practical thickness of the layer, for the sake of clarity.

If the shock absorbent rubber element 114 is not coated with the layer of the substance 114*a*, the coefficient of friction of the rubber element 114 changes in response to a change in various environmental conditions such as environmental temperature and existence of water or oil components around the drive power transmission unit. Thus, when an excessive load torque is applied to the compressor so as to cause elastic deformation of the shock absorbent rubber element 114, and when the radially bulged portions 114*b* disengage from the recesses 38*d* of the power transmitting element 38, the pulley 36 slips in relation to the power transmitting element 38, and the radially inner face of the shock absorbent rubber element 114 will fail to stably slide on the surface of the cylindrical portion 38*c* of the power transmitting element 38. Consequently, the excessive load torque might be transmitted to the external drive power source such as an automobile engine via the pulley 36.

Taking into account the above situation, the radially inner face of the shock absorbent rubber element 114 should preferably be coated with the layer of the substance 114*a* having a stable coefficient of friction, in order to permit the shock absorbent rubber element 114 to stably slide on the surface of the cylindrical portion 38*c* of the power transmitting element 38 via the layer of substance 114*a*. Then, the transmission of the excessive load torque from the compressor to the automobile engine can be prevented.

Figure 18:
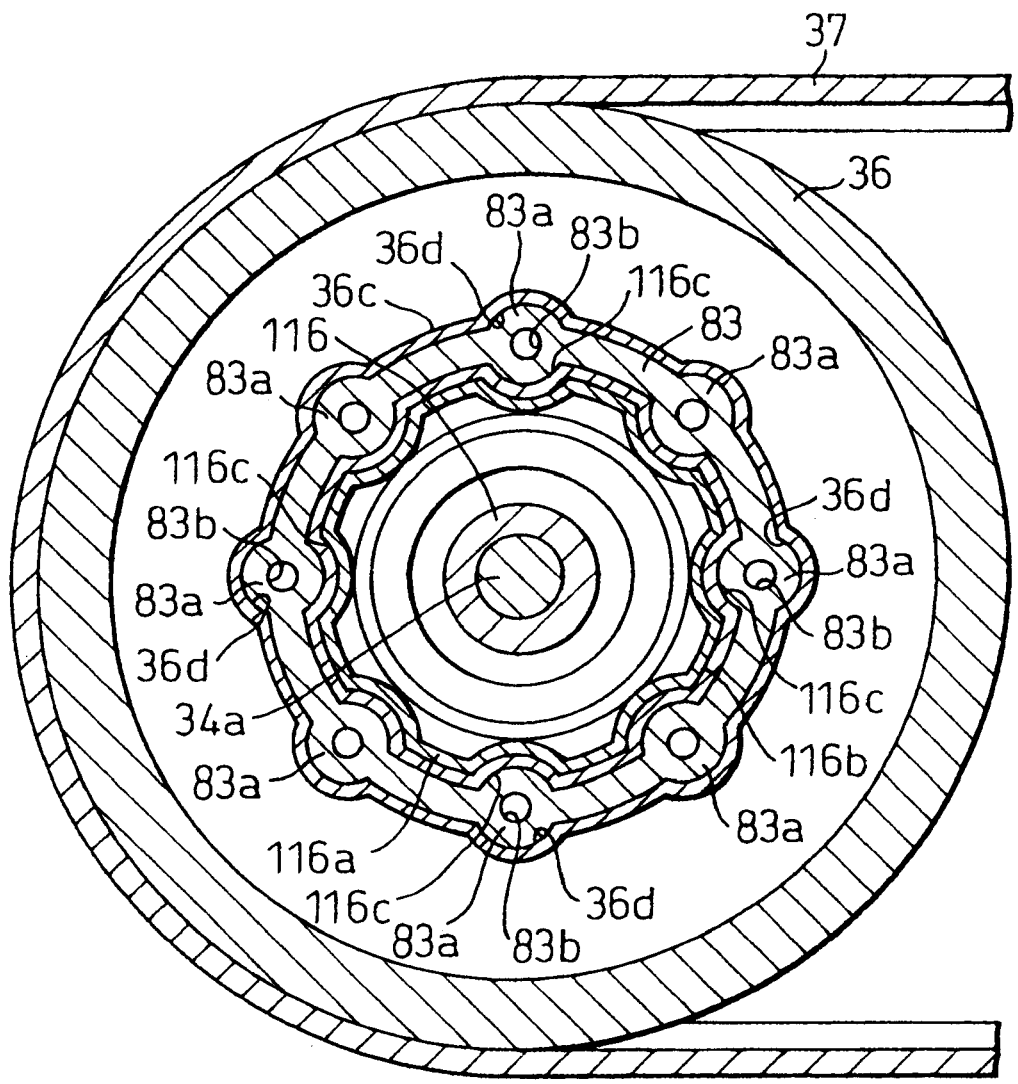
FIG. 18 is a cross-sectional view of a drive power transmission unit according to a tenth embodiment of the present invention.

FIG. 18 illustrates a tenth embodiment of the present invention.

The tenth embodiment of FIG. 18 is different from the third embodiment of FIG. 7 only in that the power transmitting element 38 of the third embodiment is replaced with a power transmitting element 116 having a cylindrical portion 116*a*. The radially inner face of the cylindrical portion 116*a* of the power transmitting element 116 is plated with a layer of substance 116*b* having a good slidable property and stable coefficient of friction. The substance 116*b* may be a combination of a matrix made of one of nickel, copper, cobalt, iron, silver, zinc, nickel-phosphorus, nickel-boron, and cobalt-boron, and a disperse phase containing particles of one of molybdenum disulfide, tungsten disulfide, graphite, graphite fluoride, polytetra-ethylene fluoride, calcium fluoride, boron nitride, polyvinyl chloride, and barium sulfate. It should be understood that the thickness of the layer of substance 116*b* is thinner than shown in FIG. 18.

Since the cylindrical portion 116*a* of the power transmitting element 116 is plated with the layer of substance 116*b* exhibiting a good slidable property and stable coefficient of friction, in spite of a change in environmental conditions such temperature and the existence of water or oil, the shock absorbent rubber element 83 can stably slide on the surface of the radially inner surface of the cylindrical portion 116*a* of the power transmitting element 116. Namely, when an excessive load torque is applied to the compressor to cause the bulged portions 83*a* of the shock absorbent rubber element 83 to thereby disengage from the recesses 116*c* of the power transmitting element 116, the pulley 36 slips with respect to the power transmitting element 116. However, due to the provision of the layer of substance 116*b*, the shock absorbent rubber element 83 can stably slide on the surface of the power transmitting element 11. Consequently, the excessive load torque is not transmitted from the compressor to the automobile engine via the pulley 36. Further, when the cylindrical portion 116*a* of the power transmitting element 116 made of metallic material is plated with the layer of the substance 116*b*, it is possible to prevent the cylindrical portion 116*a* from corroding.

In the described embodiments, each of the shock absorbent rubber elements 42, 81, 83, 87, 93, 99, 106, and 111 may be made of a synthetic rubber material containing therein lubricant such as a lubricating oil, and a solid lubricant so that the lubricant gradually oozes out and lubricates the surface of the rubber element. Then, the surface of the shock absorbent rubber element can be constantly lubricated, and accordingly, the interruption of transmission of an excessive load torque from the compressor to the external drive power source constantly occurs at a predetermined load torque.

The embodiment of FIG. 13 may be modified as set forth below. Namely, the recesses 36*d* of the pulley 36 are formed to be shallower. Each axial through-hole 106*b* of the shock absorbent rubber element 106 is located at a position deviated from the center of the bulged portion 106*a* in a direction reverse to the rotating direction "Rp" of the pulley 36, and close to the pulley 36. Further, a spacing 108 is formed between each connecting portion 107 of the shock absorbent rubber element 106 and the pulley 36. Then, when an excessive load torque is applied to the compressor, the radially bulged portions 106*a* of the rubber element 106 is elastically deformed to mainly disengage from the shallow recesses 36*d* of the pulley 36, and the pulley 36 slips in relation to the power transmitting element 38. At that time, the shock absorbent rubber element 106 can have no portion caught between the pulley 36 and the power transmitting element 38 during the elastic deformation of the respective bulged portions 106*a*. Thus, the interruption of the transmission of the excessive load torque from the compressor to the external drive power source can stably occur at a predetermined torque level.

The embodiment of FIG. 15 may be modified as set forth below. Namely, the recesses 36*d* of the pulley 36 are formed to be shallower. Each cut 111*b* in the shock absorbent rubber element 111 is located at a position deviated from the center of the bulged portion 111*a* in a direction reverse to the rotating direction "Rp" of the pulley 36, and close to the pulley 36. Further, a spacing 108 is formed between each connecting portion 107 of the shock absorbent rubber element 111 and the pulley 36. Then, when an excessive load torque is applied to the compressor, the radially bulged portions 111*a* of the rubber element 111 is elastically greatly deformed to mainly disengage from the shallow recesses 36*d* of the pulley 36, and the pulley 36 slips in relation to the power transmitting element 38. At that time, the shock absorbent rubber element 111 can have no portion caught between the pulley 36 and the power transmitting element 38 during the elastic deformation of the respective bulged portions 111*a*. Thus, the interruption of the transmission of the excessive load torque from the compressor to the external drive power source can stably occur at a predetermined torque level.

Further, in the drive power transmission unit according to the ninth and tenth embodiments, the coating layer of substance 114*a* and the plating layer of substance 116*b* may be replaced with a synthetic thin sheet having a lubricating property. Then, the synthetic thin sheet should be intervened between the shock absorbent rubber element 83, 114 and either the generally cylindrical portion 36c of the pulley 36 or the cylindrical portion 38d, 116d of the power transmitting element 38, 116. The synthetic thin sheet may be made of polytetraethylene-fluoride or polyimide containing therein glass fiber or carbon fiber as an enforcing material. When the pulley slips in relation to the power transmitting element, the shock absorbent rubber element 83, 114 can stably slide on the sliding surface of the power transmitting element 38, 116 or the sliding surface of the pulley due to the provision of the above-mentioned synthetic thin sheet. Therefore, interruption of transmission of a change in a load torque from the compressor to the external drive power source, such as an automobile engine, can stably occur at a predetermined level of the load torque.

Further, the coating layer of substance 114a and the plating layer of substance 116b may be replaced with an arrangement of a layer of particles having a lubricating property between the shock absorbent rubber element 83, 114 and either the generally cylindrical portion 36c of the pulley 36 or the cylindrical portion 38d, 116d of the power transmitting element 38, 116. The particles may consist of molybdenum disulfide particles, tungsten disulfide particles, graphite particles, graphite fluoride particles, polytetraethylene fluoride particles, and polyimide particles. When the pulley rotates idle in relation to the power transmitting element, the shock absorbent rubber element 83, 114 can stably slide on the sliding surface of the power transmitting element 38, 116 or the sliding surface of the pulley due to the provision of the above-mentioned particles having a lubricating property. Thus, interruption of the transmission of an excessive load torque from the compressor to the external drive power source such as an automobile engine can stably occur at a predetermined load torque level.

From the foregoing description of the preferred embodiments of the present invention, it will be understood that in accordance with the present invention, a drive power transmission unit for a refrigerant compressor can surely absorb and attenuate a change in a load torque applied to the compressor before the torque change is transmitted from the compressor to an external drive power source such as an automobile engine, and can surely interrupt a transmission of an excessive load torque applied to the compresor to the external drive power source.

It should further be understood that many and various modifications will occur to persons skilled in the art without departing from the spirit and scope of the invention defined by the accompanying claims.

What we claim:

1. A refrigerant compressor comprising:
   a drive shaft driven for rotating by an external drive power transmitted from an external drive source;
   a compressing mechanism housed in a housing means for compressing a refrigerant gas in response to a rotation of said drive shaft; and
   a drive power transmission means having a pulley means mounted around said drive shaft for receiving a drive power supplied from said external drive source to drive said drive shaft for rotation,
   wherein said drive power transmission means further comprises:
      a power transmitting means fixed to a front end of said drive shaft outwardly extending from said housing means of said compressor;
      a shock absorbent rubber means elastically deformably arranged between and in contact with said pulley means and said drive power transmitting means which shock absorber means extends annularly around the drive shaft; and
      positive engagement means for providing a positive engagement between said shock absorbent rubber means and at least one of said pulley means and said power transmitting means, said positive engagement means becoming inoperative by disengaging the pulley means from the power transmitting means when a predetermined load is applied to the refrigerant compressor.

2. A refrigerant compressor according to claim 1, wherein said pulley means mounted around said drive shaft and said power transmitting means fixed to said drive shaft are provided with radially confronting inner and outer cylindrical faces, each having a plurality of concave recesses for receiving said shock absorbent rubber means to thereby form said means for providing the positive engagement between said shock absorbent rubber means and said pulley means and between said shock absorbent rubber means and said power transmitting means.

3. A refrigerant compressor according to claim 2, wherein said shock absorbent rubber means comprises an annularly extending rubber element provided with a plurality of radially bulged portions disengagedly engaged in said plurality of concave recesses of said pulley means and said power transmitting means.

4. A refrigerant compressor according to claim 2, wherein said shock absorbent rubber means comprises a plurality of individual cylindrical rubber elements disengagedly engaged in said plurality of concave recesses of said pulley means and said power transmitting means.

5. A refrigerant compressor according to claim 2, wherein said concave recesses of said pulley means are arranged in a repeated manner in a circumferential direction of said pulley means leaving a given space between respective two said neighboring recesses, and wherein said concave recesses of said power transmitting means are also arranged in a repeated manner in a circumferential direction of said power transmitting means leaving a given space between said respective two neighboring recesses.

6. A refrigerant compressor according to claim 5, wherein said concave-shape recesses of said pulley means are circumferentially shifted with respect to said concave-shape recesses of said power transmitting means.

7. A refrigerant compressor according to claim 5, wherein said shock absorbent rubber means comprises a generally annular rubber element provided with radially outer and inner wavy circumferences having convex portions arranged in a repeated manner in a circumferential direction thereof, leaving a given space between respective two said neighboring convex portions, said convex portions of said annular shock absorbent rubber element being positively engaged with said concave-shape recesses of said pulley means and said power transmitting means.

8. A refrigerant compressor according to claim 1, wherein said refrigerant compressor comprises a non-clutch type refrigerant compressor in which said drive shaft is constantly connected operatively to said external drive power source.

9. A refrigerant compressor according to claim 1, wherein said refrigerant compressor comprises a refrigerant compressor incorporating therein a solenoid clutch means having a stationary clutch plate and a movable clutch plate, said movable clutch plate of said solenoid clutch means and said power transmitting means are provided with confronting portions thereof having recessed portions, respectively, for providing a positive engagement with said shock absorbent rubber means arranged between said confronting portions of said movable clutch plate of said solenoid clutch means and said power transmitting means.

10. A refrigerant compressor according to claim 1, wherein said shock absorbent rubber means comprises a generally annular rubber element having a plurality of bulged portions arranged at a given circumferential space between respective two said neighboring bulged portions, said respective bulged portions of said shock absorbent rubber means being positively engaged with said pulley means and said power transmitting means, and being provided with through-holes bored therein, respectively.

11. A refrigerant compressor according to claim 10, wherein said through-holes of said bulged portions of said shock absorbent rubber means are arranged at respective central positions of said bulged portions.

12. A refrigerant compressor according to claim 10, wherein said through-holes of said bulged portions of said shock absorbent rubber means are arranged at positions deviated from respective centers of said bulged portions of said shock absorbent rubber means in a direction reverse to a rotating direction of said pulley means.

13. A refrigerant compressor according to claim 1, wherein said shock absorbent rubber means comprises a generally annular rubber element having a plurality of bulged portions arranged at a given circumferential space between respective two said neighboring bulged portions, each of the respective bulged portions being provided with a cut-portion at a position spaced from the center of each bulged portion in a direction reverse from the direction of rotation of the pulley means.

14. A refrigerant compressor according to claim 1, wherein said shock absorbent rubber means comprises a generally annular rubber element having a plurality of bulged portions interconnected with one another by a plurality of connecting portions, and wherein a space is provided between said connecting portions of said shock absorbent rubber element and at least one of said pulley means and said power transmitting means.

15. A refrigerant compressor according to claim 1, wherein said shock absorbent rubber means comprises an annularly extending shock absorbent rubber element provided with at least a face confronting one of said pulley means and said power transmitting means and coated with a layer of substance having a stable coefficient of friction.

16. A refrigerant compressor according to claim 15, wherein said layer of substance having a stable coefficient of friction comprises at least one substance selected from the group consisting of silicone rubber, fluorine-containing rubber, and tetrafluoroethylene-propylene rubber.

17. A refrigerant compressor according to claim 1, wherein at least one of said pulley means and said power transmitting means has a contacting surface in contact with said shock absorbent rubber means and covered with a layer of substance having a stable coefficient of friction.

18. A refrigerant compressor according to claim 17, wherein said layer of substance covering said contacting surface of at least one of said pulley means and said power transmitting means comprises a matrix comprising at least one material selected from the group consisting of nickel, copper, cobalt, iron, silver, zinc, nickel-phosphorus, nickel-boron, and cobalt-boron, and a disperse phase containing particles of at least one member selected from the group consisting of molybdenum disulfide, tungsten disulfide, graphite, graphite fluoride, polytetra-ethylene fluoride, calcium fluoride, boron nitride, polyvinyl chloride, and barium sulfate.

19. A refrigerant compressor according to claim 3, wherein said annularly extending rubber element of said shock absorbent rubber means is made of a synthetic rubber material selected from the group consisting of butyl rubber, butadiene rubber, isoprene rubber, styrene-butadiene rubber, acrylonitrile-butadiene rubber, chloroprene rubber, urethane rubber, ethylene-propylene diene rubber, and thermoplastic elastomers.

20. A refrigerant compressor according to claim 4, wherein each of said plurality of individual cylindrical rubber elements of said shock absorbent rubber means is made of a synthetic rubber material selected from the group consisting of butyl rubber, butadiene rubber, isoprene rubber, styrene-butadiene rubber, acrylonitorile-butadiene rubber, chloroprene rubber, urethane rubber, ethylene-propylene diene rubber, and diverse kinds of thermoplastic elastomers.

* * * * *

UNITED STATES PATENT AND TRADEMARK OFFICE
CERTIFICATE OF CORRECTION

PATENT NO. : 6,065,943
DATED : May 23, 2000
INVENTOR(S) : Suito et al.

It is certified that error appears in the above-identified patent and that said Letters Patent is hereby corrected as shown below:

<u>Title page,</u>
Item [73], should read
-- Assignee: Denso Corporation, Kariya, Japan; and
         Kabushiki Kaisha Toyoda Jidoshokki Seisakusho, Kariya, Japan --

Signed and Sealed this

Thirtieth Day of April, 2002

Attest:

*Attesting Officer*

JAMES E. ROGAN
*Director of the United States Patent and Trademark Office*